(12) United States Patent
Karjala et al.

(10) Patent No.: US 7,444,508 B2
(45) Date of Patent: Oct. 28, 2008

(54) METHOD OF IMPLEMENTING SECURE ACCESS

(75) Inventors: Jari Karjala, Vantaa (FI); Jari Palojärvi, Tuusula (FI)

(73) Assignee: Nokia Corporation, Espoo (FI)

( * ) Notice: Subject to any disclaimer, the term of this patent is extended or adjusted under 35 U.S.C. 154(b) by 847 days.

(21) Appl. No.: 10/608,818

(22) Filed: Jun. 30, 2003

(65) Prior Publication Data

US 2004/0268142 A1    Dec. 30, 2004

(51) Int. Cl.
*H04L 9/00* (2006.01)
(52) U.S. Cl. .................. 713/156; 713/155; 713/168
(58) Field of Classification Search .............. 713/156, 713/168, 155
See application file for complete search history.

(56) References Cited

U.S. PATENT DOCUMENTS

| | | | |
|---|---|---|---|
| 6,141,751 A | 10/2000 | Ogawa | |
| 6,148,406 A | 11/2000 | Weisz et al. | |
| 6,233,618 B1 | 5/2001 | Shannon | |
| 6,772,331 B1 * | 8/2004 | Hind et al. | 713/151 |
| 6,802,000 B1 * | 10/2004 | Greene et al. | 713/168 |
| 6,853,988 B1 | 2/2005 | Dickinson et al. | |
| 7,028,333 B2 | 4/2006 | Tuomenoksa et al. | |
| 7,100,046 B2 | 8/2006 | Balaz et al. | |
| 7,103,915 B2 | 9/2006 | Redlich et al. | |
| 7,113,983 B1 | 9/2006 | Terada et al. | |
| 7,114,126 B2 | 9/2006 | Berger et al. | |
| 2001/0047400 A1 * | 11/2001 | Coates et al. | 709/219 |
| 2002/0124090 A1 | 9/2002 | Poier et al. | |
| 2002/0152209 A1 | 10/2002 | Merugu et al. | |

(Continued)

FOREIGN PATENT DOCUMENTS

EP    1475721 A1 *    11/2004

(Continued)

OTHER PUBLICATIONS

White Paper: Managing Security on Mobile Phones, Oct. 2002.

(Continued)

*Primary Examiner*—Nasser Moazzami
*Assistant Examiner*—Chinwendu C Okoronkwo
(74) *Attorney, Agent, or Firm*—Banner & Witcoff, Ltd.

(57) ABSTRACT

A mobile or other device connects to a server via a publicly accessible network such as the Internet. After installation upon the device, a virtual private network (VPN) client connects to the server and downloads a VPN profile. In one embodiment the device creates public/private key pairs and requests enrollment of a digital certificate. In another embodiment a digital certificate and public/private key pairs are provided. The device also receives a digital certificate from the server and verifies the server certificate by requesting the user to supply a portion of a fingerprint for the certificate. The invention further includes an automatic content updating (ACU) client that downloads a user profile for the VPN, requests certificate enrollment, and updates the VPN client and other applications when new content is available. A security service manager (SSM) server includes, or is in communication with, a Web server, multiple databases, an enrollment gateway and an internal certification authority (CA). A VPN policy manager application creates and manages VPN profiles and/or policies and communicates with the SSM server. The SSM server, which may reside on an enterprise intranet, may further communicate with one or more external CAs.

20 Claims, 35 Drawing Sheets

U.S. PATENT DOCUMENTS

| | | |
|---|---|---|
| 2003/0041136 A1 | 2/2003 | Cheline et al. |
| 2003/0126085 A1 | 7/2003 | Srinivasan |
| 2003/0140257 A1 | 7/2003 | Peterka et al. |
| 2004/0203593 A1 | 10/2004 | Whelan et al. |

FOREIGN PATENT DOCUMENTS

| | | |
|---|---|---|
| WO | WO 02/073377 A2 | 9/2002 |
| WO | 02078290 | 10/2002 |

OTHER PUBLICATIONS

White Paper: The Evolution of VPN and its Implications for Mobile Phone Security, Oct. 2002.

Symborski, "Updating Software and Configuration Data in a Distributed Communications Network", IEEE 1988, pp. 331-338.

EP Search Report for EP 04253084 dated Mar. 5, 2007.

Examination Report for EP04253083.2-2413.

* cited by examiner

METHOD OF IMPLEMENTING SECURE ACCESS

CROSS-REFERENCES TO RELATED APPLICATIONS

This application is related to the U.S. patent application Ser. No. 10/609,011 titled "Method for Implementing Secure Corporate Communication," filed simultaneously herewith and having the contents of which are incorporated by reference herein.

FIELD OF THE INVENTION

This invention pertains to the field of secure access to a communication network, and more particularly to the field of securely accessing a remote server or other device via a publicly accessible communication network.

BACKGROUND OF THE INVENTION

Digital certificates are well known. Descriptions of digital certificates and their use are available from many sources, including <http://www.webopedia.com/TERM/d/digital_certificate.html> and <http://wp.netscape.com/security/techbriefs/servercerts/index.html> (including related linked pages), which are incorporated by reference herein. In brief, a digital certificate from a Certification Authority (CA) contains, in encrypted form, a public encryption key and other identifying information about the certificate holder. The certificate is attached to communications from the certificate holder, and can only be decrypted (at least without very substantial efforts) by using a public key from the Certificate Authority. When received and decrypted (using the CA public key), the certificate holder's public key can be used to create a Secure Socket Layer (SSL) connection with the certificate holder for secure communication. Digital Certificates can be used for, e.g., authentication of individuals, of particular user devices, of servers, and of numerous other devices.

There remains, however, a need for scalable systems and methods for obtaining secure access to corporate intranets and other resources via the Internet and other publicly accessible networks. The need is especially acute in the case mobile devices such as mobile telephones, personal digital assistants (PDA), mobile terminals and other devices able to access the Internet. Ease of deployment is often critical in such devices, as there may be numerous devices in use. Moreover, such devices typically have limited capabilities compared to personal computers (PCs) or laptop computers.

It has been found that when no user action is required to initiate a SSL or other secure session, a user often gives little thought to a digital certificate. For example, an end-user should verify that a digital certificate for a server is valid and/or held by the entity with which the user wishes to communicate. A common manner of obtaining verification from the user is showing the name of the certificate holder and asking the user to accept or not accept the certificate. Many users always accept without any real consideration. Accordingly, there remains a need for more secure methods and systems for initiating secure communication.

SUMMARY OF THE INVENTION

The present invention addresses these needs by providing secure network access to a great variety of users. In one embodiment of the invention, a method includes connecting a user device via a publicly-accessible network to a server. The method further includes receiving a certificate, calculating a fingerprint of the received certificate and converting it to a character string. The method also includes modifying the fingerprint by removing at least one random character from the string, displaying the modified string, and receiving, from a user previously provided with the fingerprint through a trusted medium, input corresponding to the at least one removed character. Connection to the server is continued only if the user input matches the at least one removed character. A user device according to the invention includes an interface to a publicly accessible network and a processor configured to perform various steps, including receiving, via the interface, a certificate from a remotely located server. The processor calculates a fingerprint of the received certificate and converts it to a character string, and the modifies the string by removing at least one random character. The processor then displays the modified string and receives, from a user of the device previously provided with the fingerprint through a trusted medium, input corresponding to the at least one removed character. The processor continues connection to the server if the user input matches the at least one removed character.

Other and further aspects of the present invention will become apparent during the course of the following description and by reference to the attached drawings.

BRIEF DESCRIPTION OF THE DRAWINGS

The foregoing summary of the invention, as well as the following detailed description of preferred embodiments, is better understood when read in conjunction with the accompanying drawings, which are included by way of example, and not by way of limitation with regard to the claimed invention.

DETAILED DESCRIPTION OF THE PREFERRED EMBODIMENTS

In the following description of various illustrative embodiments, reference is made to the accompanying drawings that form a part thereof, and in which is shown by way of illustration various embodiments in which the invention may be practiced. It is to be understood that other embodiments may be utilized and structural and functional modifications may be made without departing from the scope of the present invention.

Figure 1:
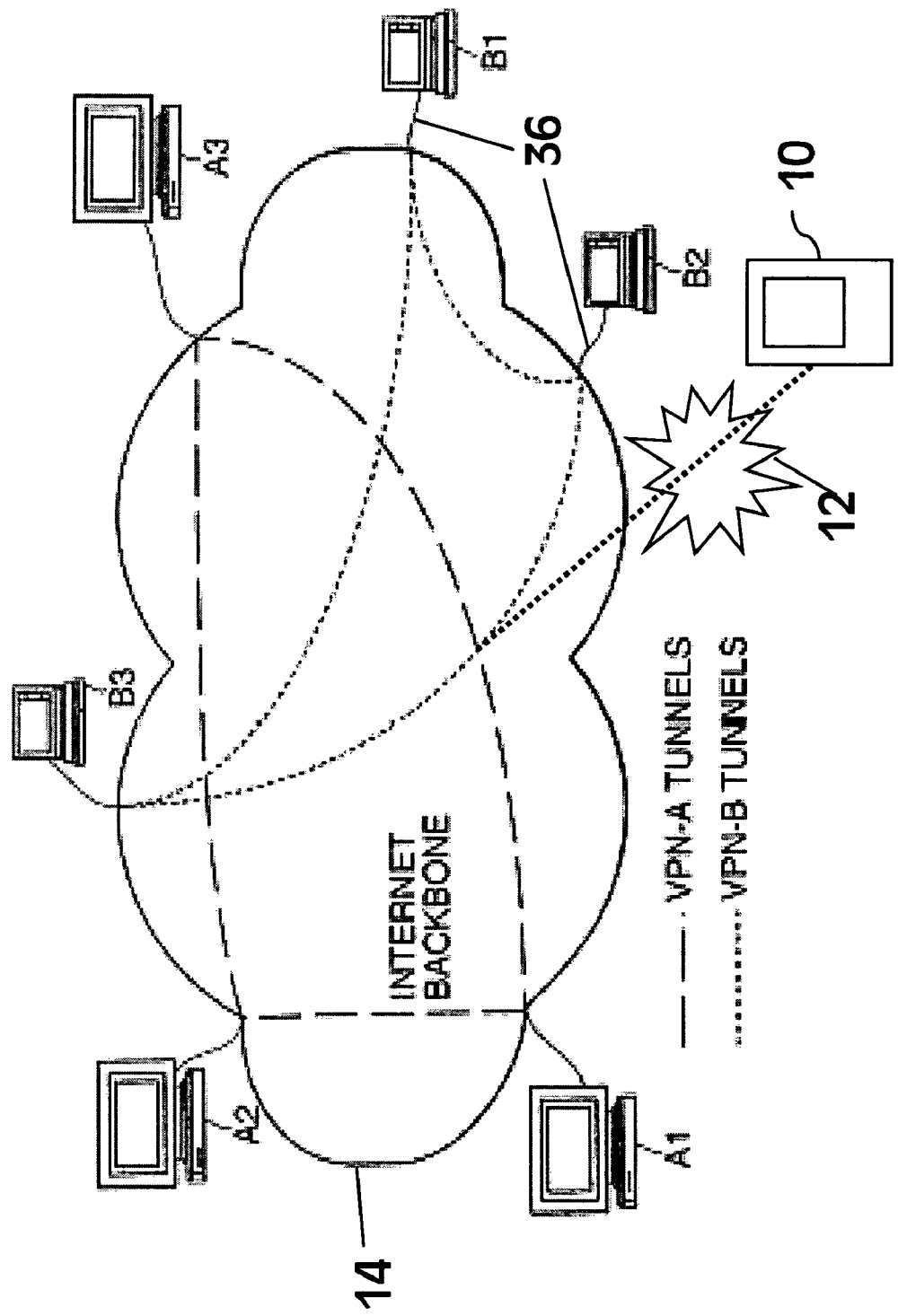
FIG. 1 is a block diagram illustrating an exemplary network environment in which a mobile device may access remotely stored data in accordance with various embodiments of the present invention.

Referring now to the drawings, wherein like reference numerals refer to like parts, FIG. 1 illustrates a block diagram of several virtual private networks (VPN) distributed across a backbone packet data network 14. In at least one embodiment, packet data network 14 is the Internet. As illustrated, VPN-A is connected by tunnels (indicated by long dashes) which represent secure communications between devices A1, A2 and A3. Similarly, VPN-B is connected by secure tunnels (indicated by short dashes) between devices B1, B2 and B3. VPN networks A and B are located in a company or organization having multiple locations. The VPN architecture illustrated in FIG. 1 permits an employee or member of the company or organization (or other authorized person) to access the company or organization's local area network (LAN) after connection to the company or organization's VPN by secure tunnels over the Internet or other backbone packet data network. In at least one embodiment, the connection is secured by a tunneling technology such as Secure Sockets Layer (SSL). However, the invention is not limited to any particular technology for securing the connection. A mobile device 10 may communicate through a mobile network 12 to the Internet 14 and then to and from the different devices B1-B3. Devices B1-B3 could be part of the same intranet, or could be dispersed across multiple intranets or other Local Area Networks (LANs) or Wide Area Networks (WANs).

Figure 2:
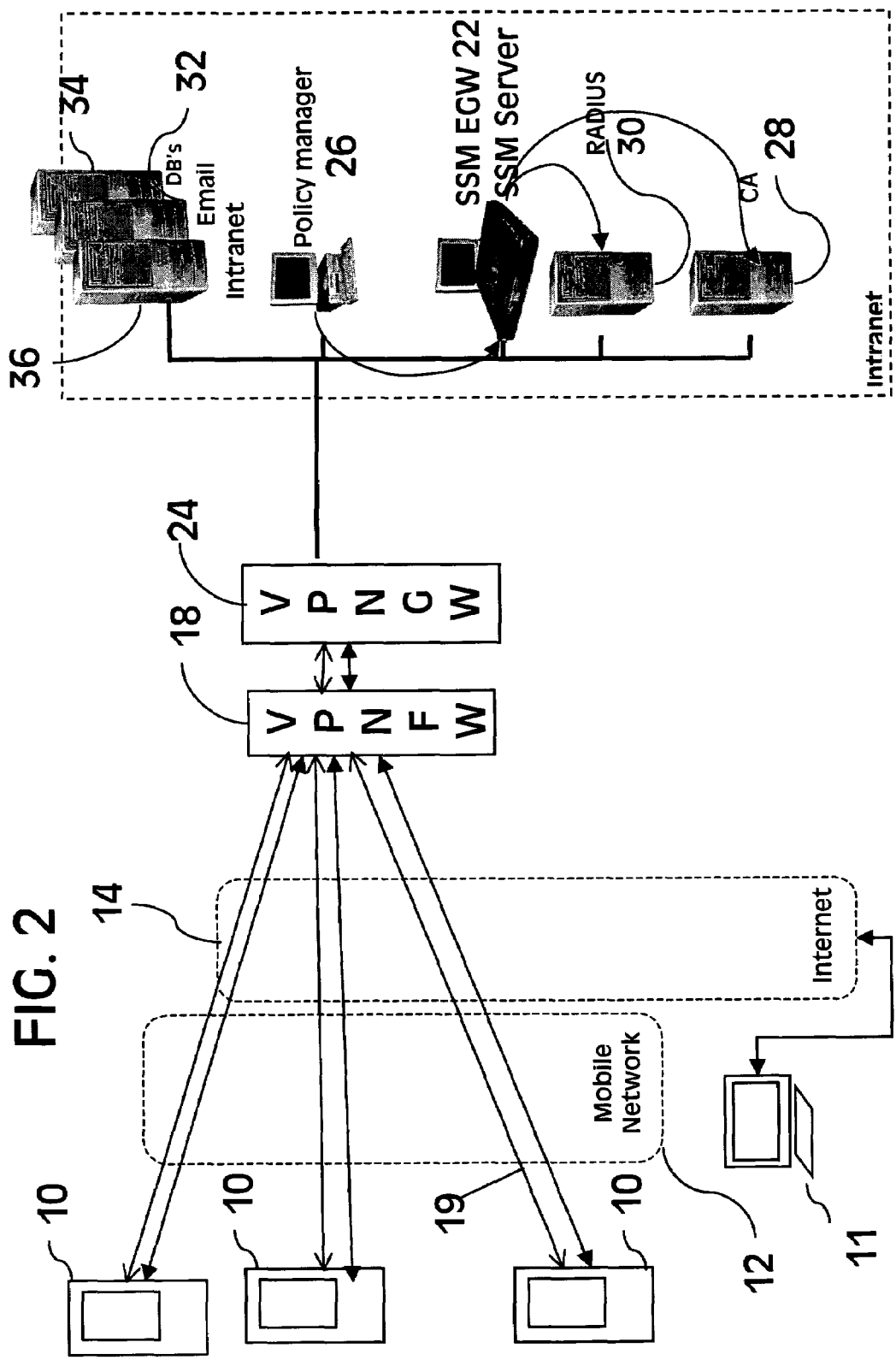
FIG. 2 is a block diagram illustrating an exemplary system in accordance with at least one embodiment of the invention.

FIG. 2 is a block diagram illustrating a mobile virtual private network (VPN) client system according to an embodiment of invention. One example of a mobile device in which a client of the system can be implemented is a Series 60 or SYMBIAN OS (i.e., the SYMBIAN OS operating system available from Symbian Ltd. of London, U.K.) enabled mobile device having VPN client software installed upon it. Examples of such devices include the Nokia 7650 and 3650 telephones and 9210 communicator (available from Nokia Corp. of Espoo, Finland). Mobile devices 10 communicate via a wireless network 12 and Internet 14 to a VPN firewall 18 and a VPN gateway 24. Mobile devices 10 and computer 11 can establish a VPN tunnel connection 19 if firewall 18 allows the connection to Intranet 36.

Figure 3:
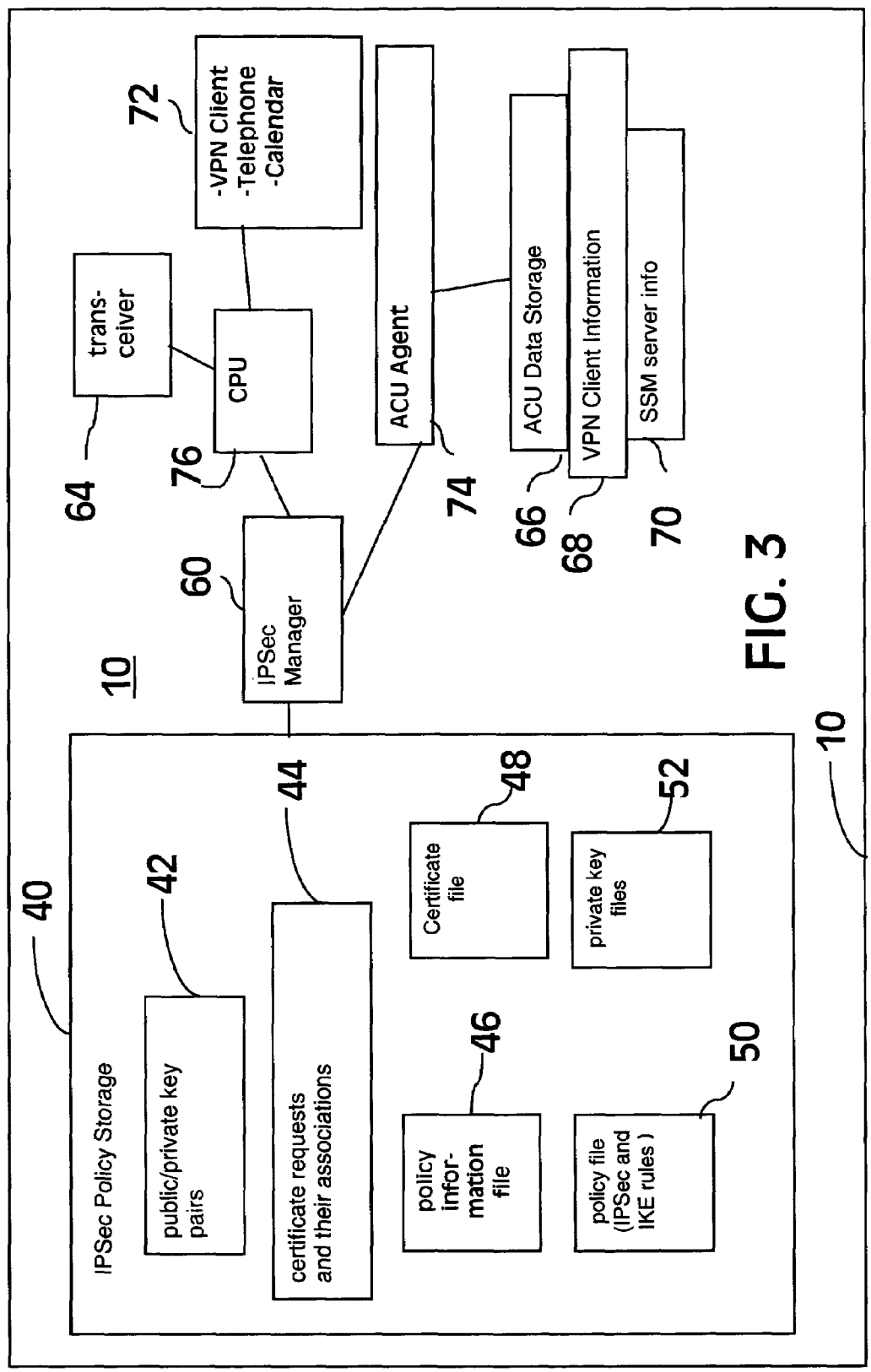
FIG. 3 is a block diagram illustrating an exemplary mobile device in accordance with at least one embodiment of the present invention.

Mobile VPN client software (VPN client) is first installed in mobile device 10 for communication with security service manager (SSM) server 20. The VPN client is shown in FIG. 3 as one of the installed applications 72 in mobile device 10, and is explained more fully below. The user can download the VPN client using an ordinary web browser, via an infrared, BLUETOOTH, or WLAN connection, via broadcasting or multicasting (e.g., DVB-T or its modifications), via email, or via CD-ROM or other removable media (e.g., any other machine-readable medium having machine-executable instructions). The VPN client is delivered as, e.g., a SYMBIAN OS operating system SIS file for easy installation in mobile device 10.

SSM server 20, through a Web server 90 (shown in FIG. 5), has an interface for filtering requests received from remote sources such as mobile device 10. Only authenticated users are allowed to access SSM server 20. User authentication is based on username/password combinations that a remote device user enters into a HTML form provided by the external User Interface (UI) of Web server 90. A successful authentication causes SSM server 20 to create a session for the authenticated user. The session is then identified between subsequent page requests by encoding a session ID into the URLs for the pages stored in Web server 90. Specifically, each link to subsequent web pages contains a session ID parameter that SSM server 20 uses to validate the page requests. Servlets and JSP pages on Web server 90 create the URLs in the web pages. The user can log out from SSM server 20 using a link in a web page provided by Web server 90. Because users do not always remember to log out, however, the user sessions have a short timeout value. In one embodiment, all pages of Web server 90 are only accessible through SSL connections. Usernames, passwords and session IDs are thus transferred only over encrypted connections.

Exemplary VPN Client Installation in User Interface of Mobile Phone

All requests from mobile device 10, including requests from a user's browser, are sent via hypertext transfer protocol (HTTP) to SSM server 20. In at least one embodiment, HTTP connections 19 from mobile devices 10 in the Internet 14 pass through VPN gateway 24 and/or firewall/proxy server 18, and SSM server 20 is not connected directly to the Internet 14.

Figure 8:
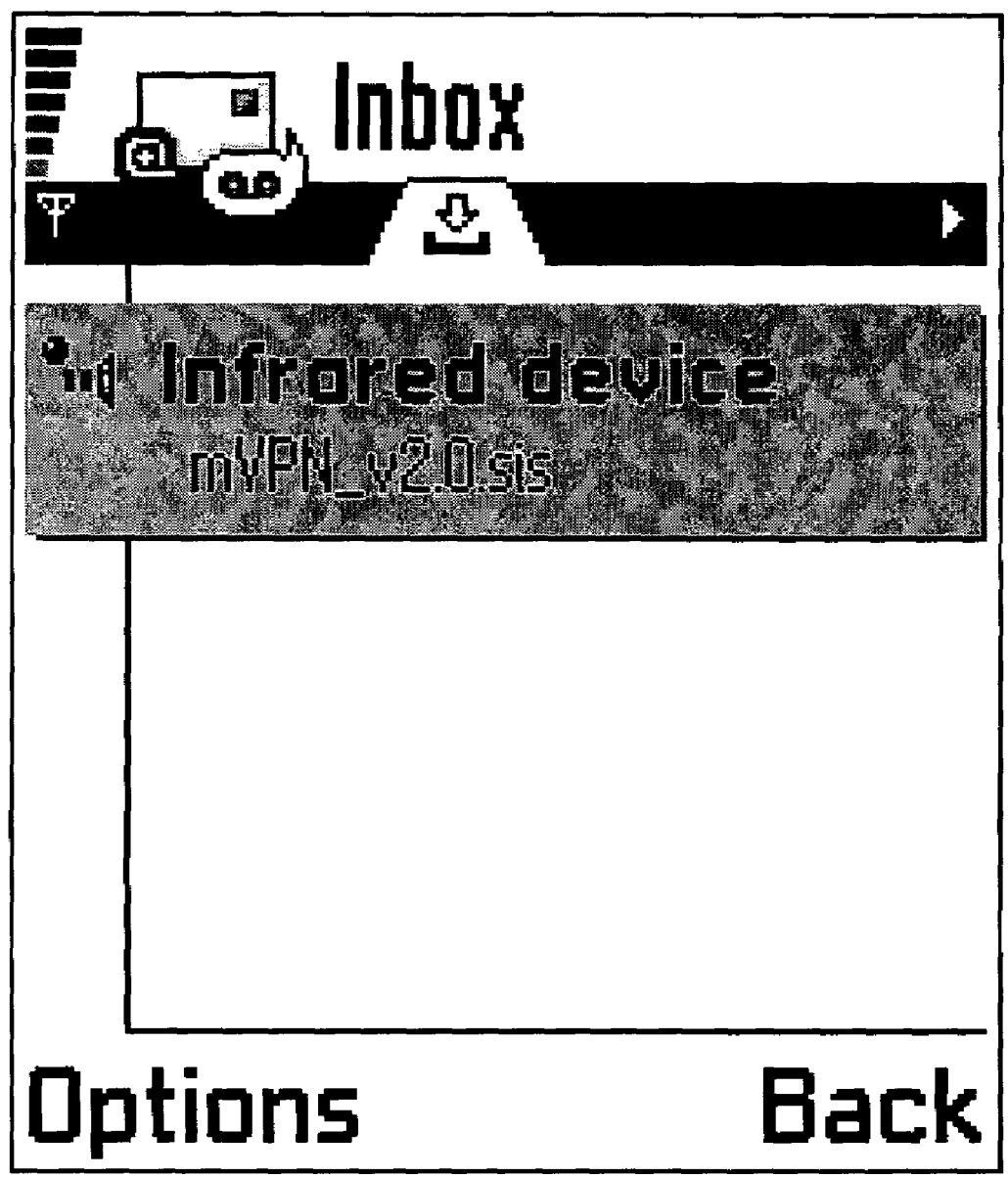
FIGS. 8-35 are examples of User Interface displays in a mobile device according to at least one embodiment of the invention.
Figure 9:
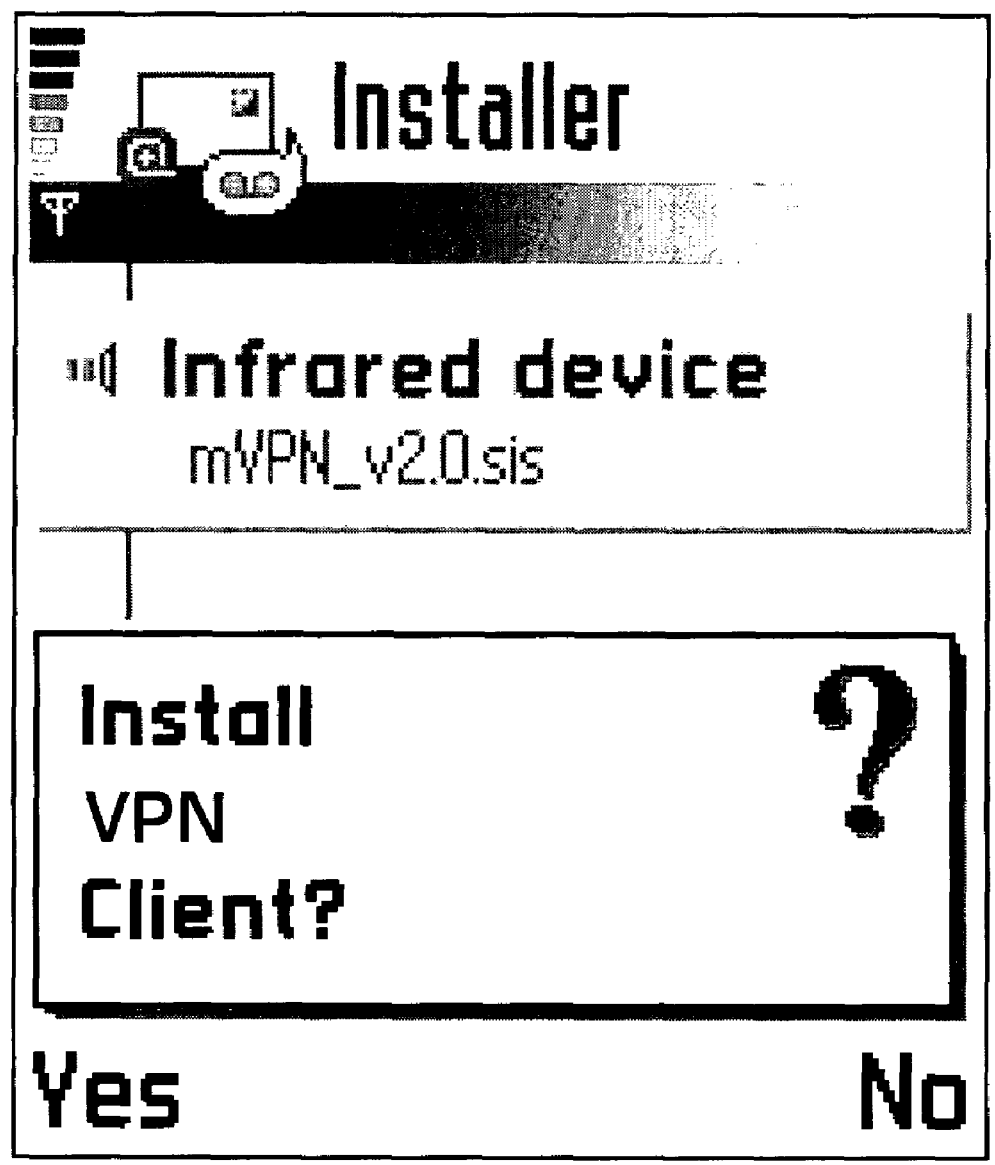
Figure 10:
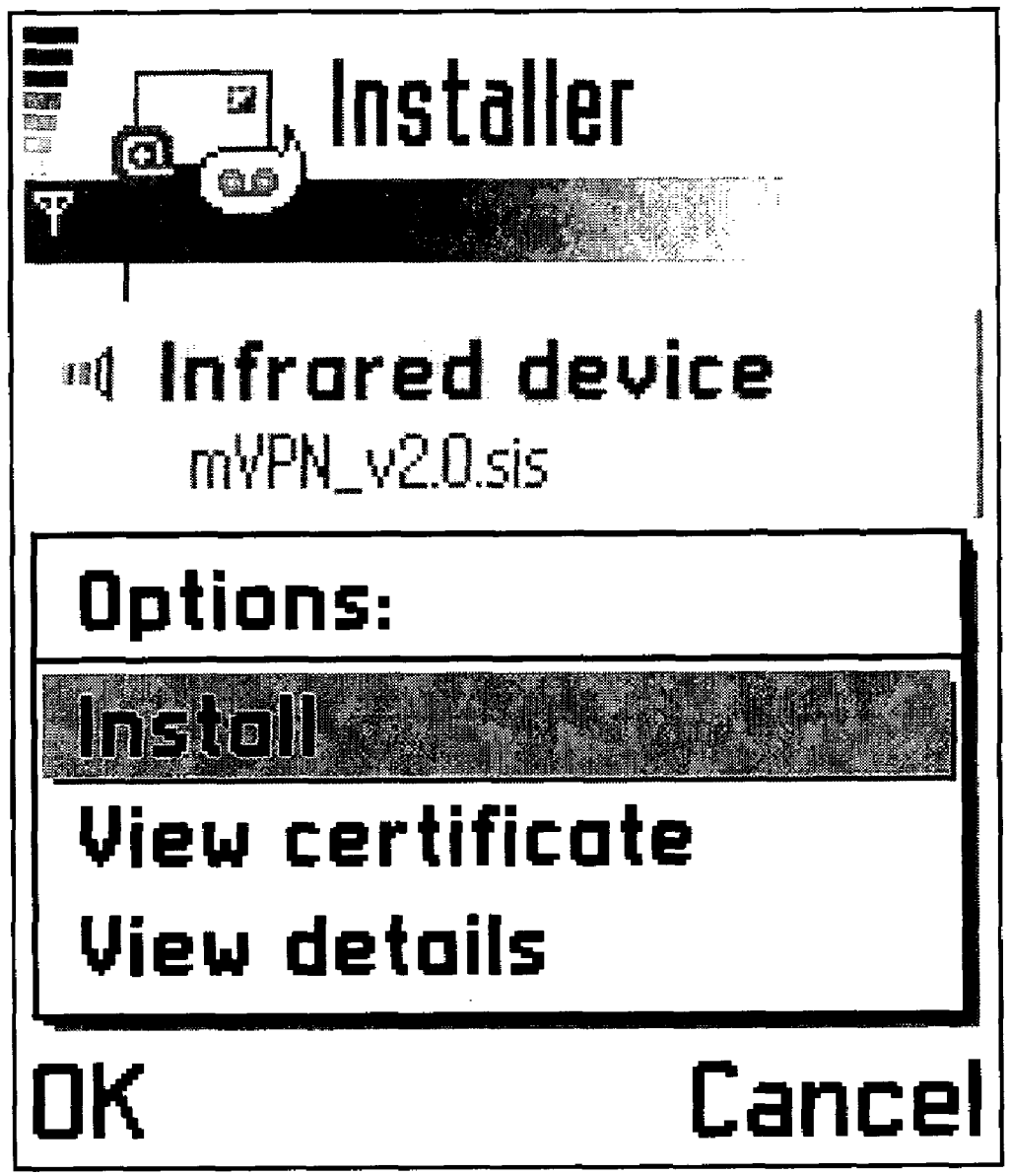
Figure 11:
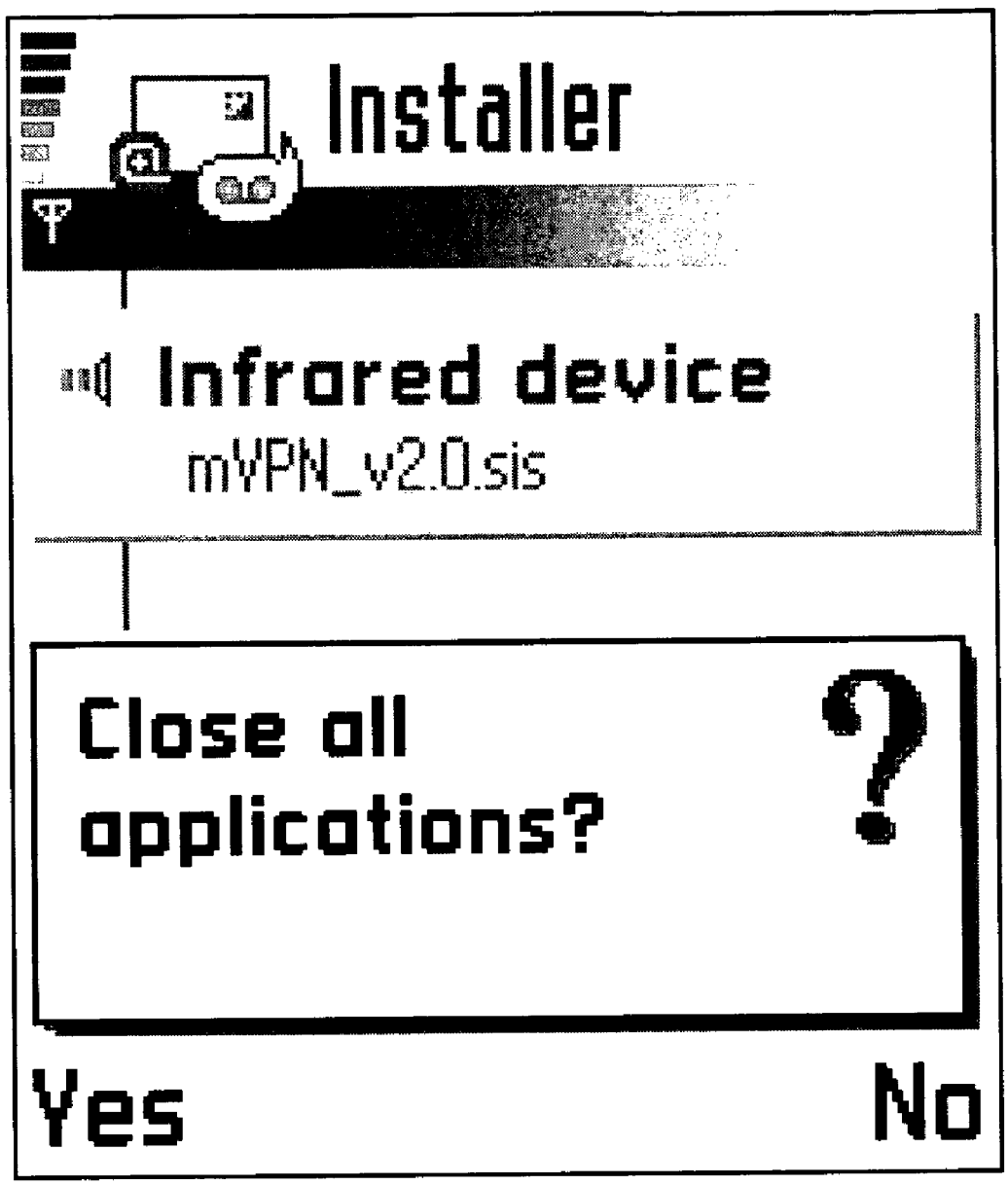
Figure 12:
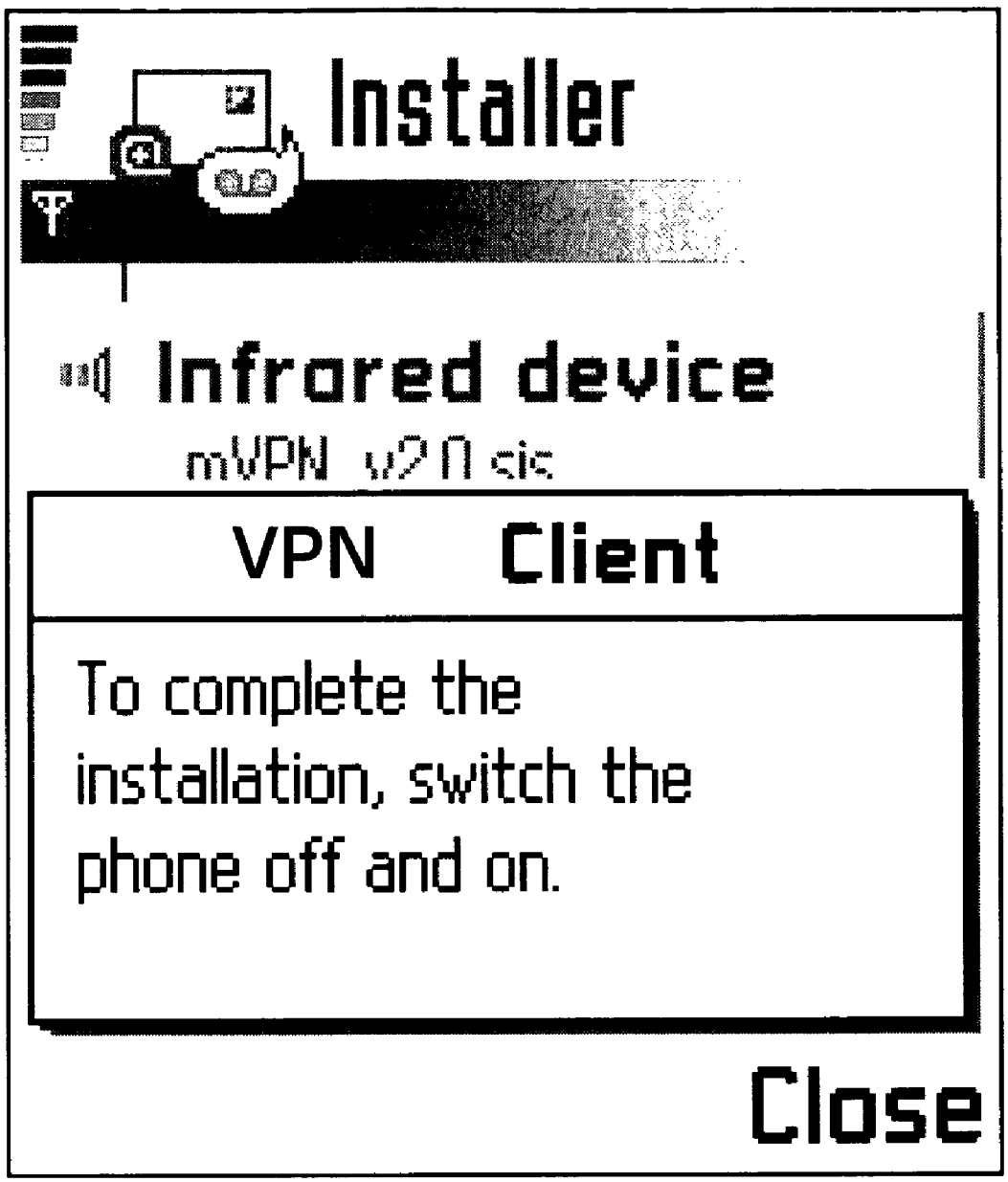
Figure 13:
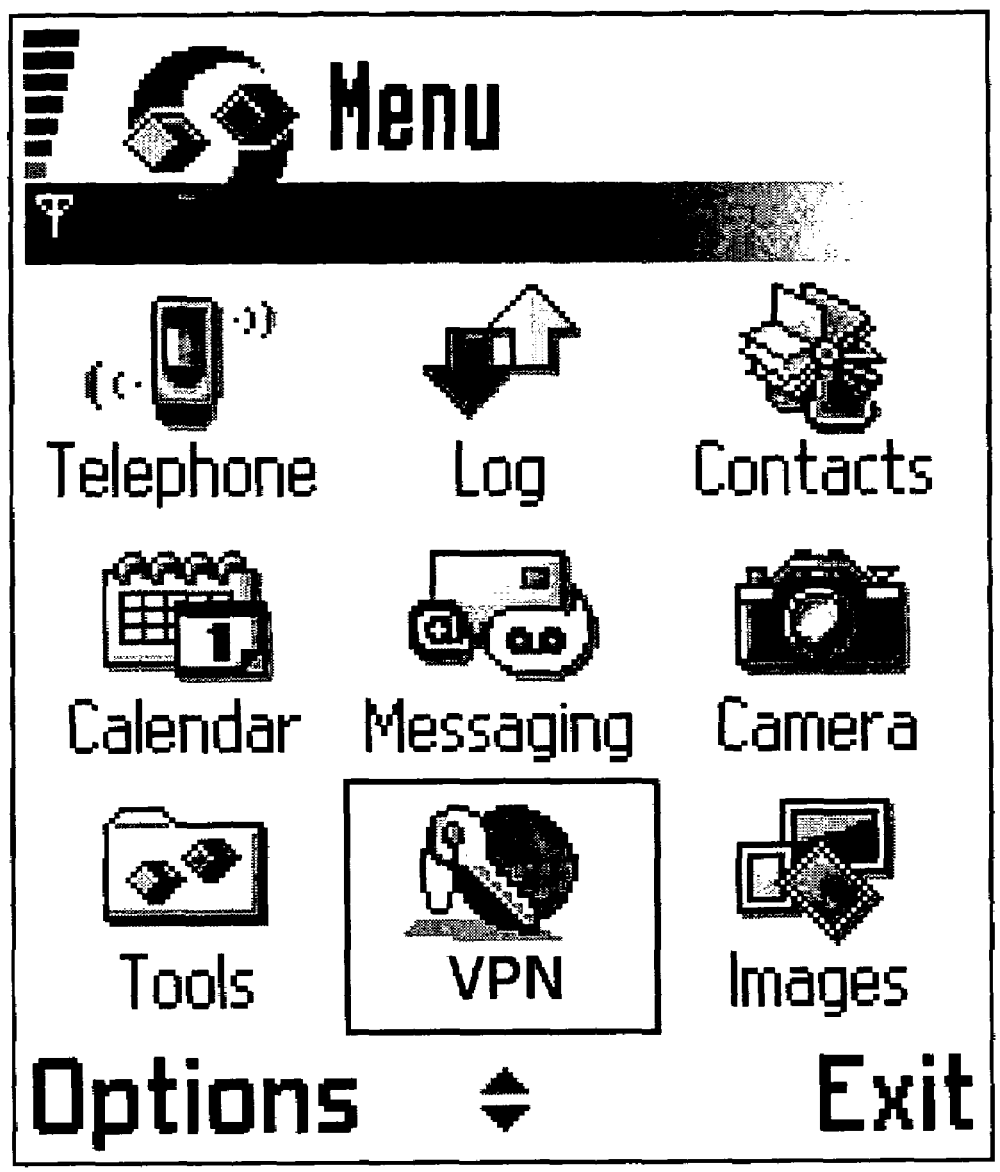

Mobile device 10, which includes a display screen, a keypad and/or other input and output devices, provides various interfaces to a user during installation of a VPN client. After download, the display indicates that a SIS file containing the VPN client is present (FIG. 8). Upon opening that file, the user is prompted to install the software by selecting "Yes" (FIG. 9), which starts the installation process. Selecting "No" cancels the installation. Upon selecting Yes, the user is provided with several selections in an options menu: "install," "view certificate," or "details about the product being installed" (FIG. 10). After selecting "install," the user is asked to close all active applications running on the device (FIG. 11). This is for safety reasons, so that other applications do not interfere with the installation. After closing any other applications, the actual installation starts. When installation is complete, the installation process asks the user to switch the device off and on again (FIG. 12). This ensures that all low level components are properly installed when the device is turned back on. After installation, a Mobile VPN client icon appears on an application menu (FIG. 13). Users can move the client icon anywhere in the application menu or to any folder.

The installation process employs an Automatic Content Update (ACU) service. The ACU service includes a protocol between mobile device 10 and SSM server 20 that allows device 10 to keep its local content storage synchronized with the content of SSM server 20. In one embodiment, ACU service client software (ACU client) is part of the mobile VPN client, and is installed prior to installing other components of the VPN client. The ACU client setup phase comprises two protocol transactions. The first transaction is used to download an ACU client configuration package to the mobile client and the second transaction is used to enroll an ACU client certificate. The client certificate is used in subsequent ACU communications to sign ACU requests and to authenticate responses to requests.

SSM server 20 includes a database 98 (FIG. 5), which in turn comprises additional databases. A configuration database allows clients to fetch client configuration packages from SSM server 20. A certificate enrollment database allows clients to enroll certificates with SSM server 20. A content metadata database allows clients to fetch metadata about the content stored in a content database. The content database allows clients to fetch actual content from SSM server 20. All databases contain some type of data that a client can fetch. While the configuration database contains only client configuration packages, however, the content database can contain any kind of data. The content in the databases is also assigned one or more properties; these properties are included in search filters of ACU requests in order to find the desired data. For example, the certificate enrollment database supports properties such as certificate requests prepared using PKCS#10 (or other certificate request syntax) and entity name; the content database supports properties such as content ID and type.

Different levels of security authorization from incoming ACU request messages are required for access to the different databases. In at least one embodiment, there are three levels of security: Req1 (lowest), Req2 (intermediate) and Req3 (highest). The configuration database accepts all security levels (Req1, Req2 and Req3), while the content database requires the highest security level (Req3). Table 1 below summarizes security level requirements, content properties and contents types of SSM server 20 databases in one embodiment. For example, the certificate enrollment database stores and returns X.509v3 certificates (e.g., "application/pkix-cert"). As is known in the art, X.509 refers to the International Telecommunications Union recommended standard for digital certificates. Search filters in a request targeting the certificate enrollment database can include three properties, an entity name, a request type and a PKCS#10 certificate request. The certificate enrollment database requires requests to have security level Req2 or Req3.

TABLE 1

| Database | Supported request security levels | Supported content properties (in search filters) | Stored and returned content types |
|---|---|---|---|
| Configuration database | Req1 Req2 Req3 | ACUServerAddr (the address of the ACU server) | client configuration (e.g., "application/x-acu-client-config") |
| Certificate enrollment database | Req2 Req3 | EntityName (an additional piece of information that can be used to find the right enrollment service at a server) RequestType "new" if a new request "poll" if a repeated request, i.e. a certificate poll after a pending status "renewal" if a certificate renewal request "renewalpoll" if a repeated renewal request PKCS#10 (Base64-encoding of a DER-encoded PKCS#10 certificate request) | Base64-encoding of a DER-encoded certificate (e.g., "application/pkix-cert") |
| Content metadata database | Req3 | TargetContentID (the ID of a content item in the content database) TargetContentType (the type of a content item in the content database) TargetContentTimestamp (the timestamp of a content item in the content database) | metadata (e.g., "application/x-acu-metadata") |
| Content database | Req3 | ContentID (the ID of a content item) ContentType (the type of a content item) ContentTimestamp (the ID timestamp of a content item) | The type of the requested content |

On receipt of a first response package from SSM server 20, mobile device 10 establishes a trust relationship with SSM server 20. In particular, mobile device 10 validates and stores a returned SSM server certificate. The stored SSM server certificate is then used to automatically validate subsequent ACU responses from the same server.

Mobile device 10 and server 20 complete the ACU and VPN client setup phase before starting other operations (e.g., updating content from other applications on device 10, using a VPN for secure communication by another application, etc.). Target databases used during client setup can vary. However, example target databases and message security levels used in ACU client setup phase are described in Table 2 and in FIG. 7.

TABLE 2

| Message | Target Database | Security Level |
|---|---|---|
| 1 | ./acu_config_db | Req1 |
| 2 | N/A | Resp1 |
| 3 | ./acu_cert_db | Req2 |
| 4 | N/A | Resp2 |

Message 1 is used by the ACU client to fetch an ACU client configuration package from an ACU server (e.g., SSM server 20). That server uses message 2 to return an ACU client configuration package to the ACU client. The ACU client uses message 3 to enroll an ACU client certificate with the ACU server. That server uses message 4 to return an ACU client certificate to the ACU client. During a subsequent operational phase, the ACU client sends a message to fetch content metadata or actual content from an ACU server, or to enroll a certificate with an ACU server (not shown in FIG. 7 or Table 2). This can include fetching a VPN policy from SSM server 20. In response, the server returns content metadata, actual content or a certificate to the ACU client. This can include returning a VPN policy to the ACU client.

If a SSM server or client certificate expires or otherwise becomes invalid, mobile device 10 initiates a new client setup phase and performs the appropriate initialization steps. If mobile device 10 receives a successful authentication status, but also receives an indication that the mobile client certificate is about to expire, mobile device 10 can enroll a new client certificate using the about-to-expire certificate for authenticating the request. Once the new certificate is received, it replaces the old one.

Messages from mobile device 10 to SSM server 20 have a portion which defines the session ID (e.g., a number) and message ID (e.g., also a number), SSM server 20 and client address(es). The client address portion may, optionally, also contain authentication information. A body portion of the message identifies the version of the ACU protocol (e.g. "SyncML/1.0") used in this message and expected to be used in the response package. The body portion further includes a query containing properties of the content that the client wants to retrieve from the server. For example, a query may contain the absolute URI of SSM server 20 (e.g., "http://<acuserver-name>/acu"). In one embodiment, the query value is same as the destination uniform resource identifier (URI) used at the HTTP level. The message from mobile device 10 further includes an absolute URI or an international mobile station equipment identity (IMEI) uniform resource number (URN) that uniquely identifies mobile device 10 (e.g., "http://<client-name>:<port>" or "IMEI: 493005100592800"). The inclusion of client authentication and identity information depends on the security level of the request message. The message from mobile device 10 also indicates whether the message is the last message of a package. In at least one embodiment, an ACU package is always contained in a single message, and a "final element" description would thus be present in all ACU messages from device 10.

In one embodiment, the body of an ACU response message from SSM server 20 includes an identifier of the version (e.g. "1.0") of XML (extensible markup language) used in, e.g., the ACU protocol; a status information element used to inform the application sending a particular element about the result of that element's processing by SSM server 20 or other recipient (e.g., an error code indicating why communication was not successful); a version of the ACU protocol (e.g. "SyncML/1.0"); the properties of the content that the client wants to retrieve from the server in the corresponding request; and information on Status/Results element pairs for additional Search elements (if any) in the corresponding request package. Results elements are present only if the corresponding queries return some content. The ID of the content item, which in at least one embodiment is the same as the ID element value in the corresponding ACU metadata, can be used as the value of the ContentID content property in ACU search filters for the content database.

Figure 7:
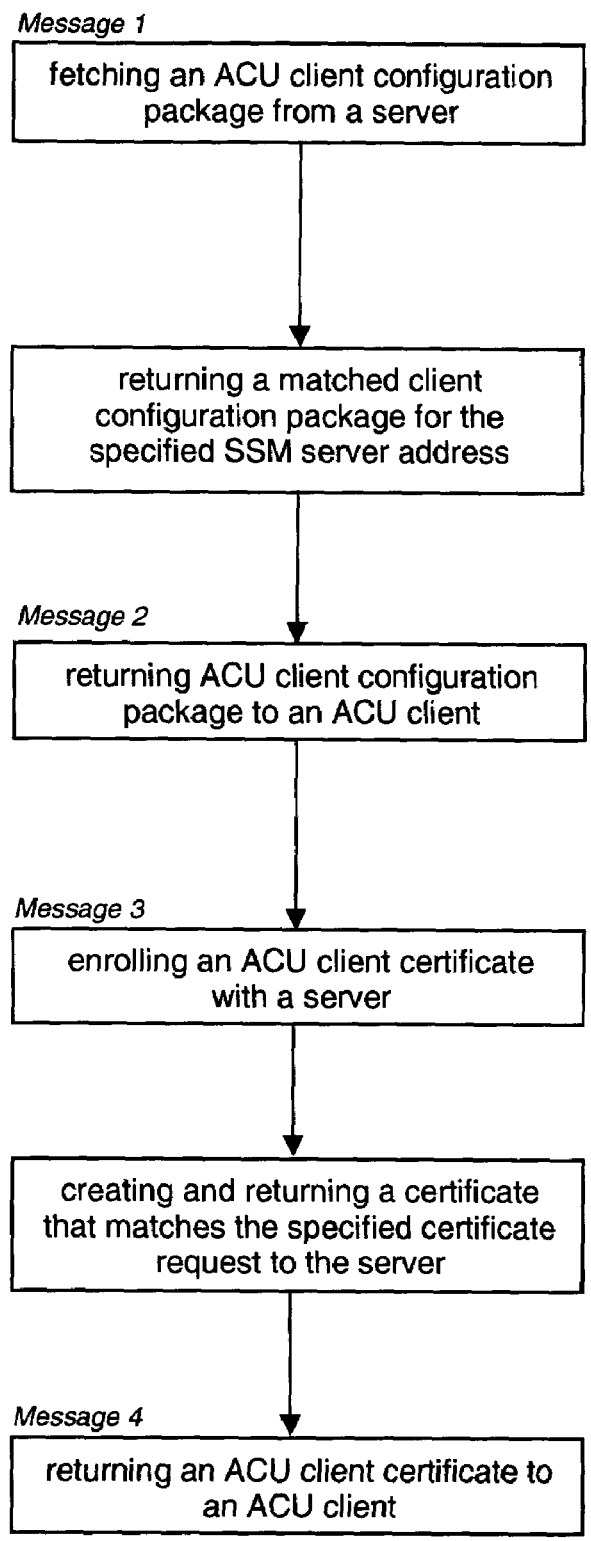
FIG. 7 is a flow sheet showing steps of ACU message handling according to at least one embodiment of the invention.

Various application programs operating upon mobile device 10 may employ the ACU client installed on the mobile device. When an application specifies a content ID in a content updating request, the ACU Agent 74 (FIG. 3) calls an Internet Protocol Security (IPSec) manager 60 to obtain the identity of the server with which the updating process is to be performed, and prompts the user of the device to provide the VPN client password. When ACU agent 74 has the server identity (SSM server 20 in the present example), ACU agent 74 continues the updating process by querying the application for a list of content types desired. ACU Agent 74 further asks the application for metadata (e.g., IDs, types and timestamps) about the desired content. After communication with the identified server (here, SSM server 20) has been properly initialized, ACU Agent 74 generates an ACU request message to SSM server 20. That message fetches metadata regarding the content that SSM server 20 has associated with the client application that is requesting an update and/or the user of that application. The ACU request includes a search filter that lists all content types that the client application wishes updated. ACU agent 74 then compares metadata returned by SSM server 20 to metadata in the application requesting an update. If differences occur, ACU agent 74 sets a server content update configuration parameter (e.g., "ForceUpdates") in ACU data storage 66 (FIG. 3). ACU agent 74 then fetches all new and changed content (if any) from SSM server 20. FIG. 7 is an exemplary view of a flow diagram describing how ACU messages are handled according to one embodiment of the invention.

VPN Policy Installation UI of Mobile Phone

One or more VPN policies are one type of content retrieved by mobile device 10 from SSM server 20. A VPN policy contains all the information required by a mobile device with a VPN client (e.g., "mVPNClient"), such as mobile device 10, to establish secure connections to SSM server 20 so as to, in at least one embodiment, access email 32, databases 34 and other facilities in the enterprise Intranet (FIG. 2). In one embodiment, the policy contains end-user identity data such as certificates and private keys. A VPN policy without certificates, private keys and other user-specific data is called a "profile." Multiple end-users can obtain the same profile, and then create individualized policies. In one embodiment, VPN policies and profiles are managed and administrated in SSM server 20, which in turn includes and/or is in communication with policy manager application 26, database 98 and certificate authority 28.

A single VPN policy may require multiple user certificates. For example, a policy created by policy manager application 26 and transferred to database 98 of SSM server 20 could contain several VPN gateway definitions, with each definition using certificate authentication but relying on a different certificate authority. Consequently, a single policy may require multiple certificate enrollment processes before becoming ready for activation. Although a policy may have multiple associated user certificates, there is, in at least one embodiment, a single public/private key pair of a given size for a policy. In other words, all certificates associated with a single policy and using the same key size refer to the same public/private key pair.

In one embodiment, and as shown in FIG. 3, files constituting a VPN policy are contained in IPSec policy storage 40 and include a policy information file 46 (containing general information about the policy), a policy file 50 (containing IPSec and Internet Key Exchange, or IKE, rules), one or more certificate files 48 and one or more private key files 52. In at least one embodiment, IPSec policy storage 40 stores public/private key pairs 42, certificates 48, and certificate requests and associations 44 (described below) for any application, not only the VPN client. IPSec policy storage 40 is modifiable to support new content properties that may be required by ACU agent 74.

Applications 72 operating on mobile device 10 access the ACU client through ACU agent 74. In one embodiment, the VPN client accesses ACU Agent 74 through IPSec manager 60.

At various stages during the content updating and certificate enrollment process, ACU agent 74 communicates with the client application (e.g., the VPN client) that initiated the updating, enrollment or other process.

ACU data storage 66 contains information about the client applications using the ACU client, such as VPN client information 68. ACU data storage 66 also contains information 70 on servers with which ACU agent 74 communicates on behalf of client applications, such as SSM server 20. The actual content and content metadata fetched from servers is stored by the respective client applications that requested update or other ACU service. In the case of the VPN client, content and content metadata is stored in IPSec Policy Storage 40. As also shown in FIG. 3, mobile device 10 includes an interface to mobile network 12 such as transceiver 64, a CPU 76, as well as telephone and calendar applications. Although not shown, mobile device 10 would also have one or more user input devices (e.g., a keyboard), output devices (e.g., a display) and other known components.

Figure 4:
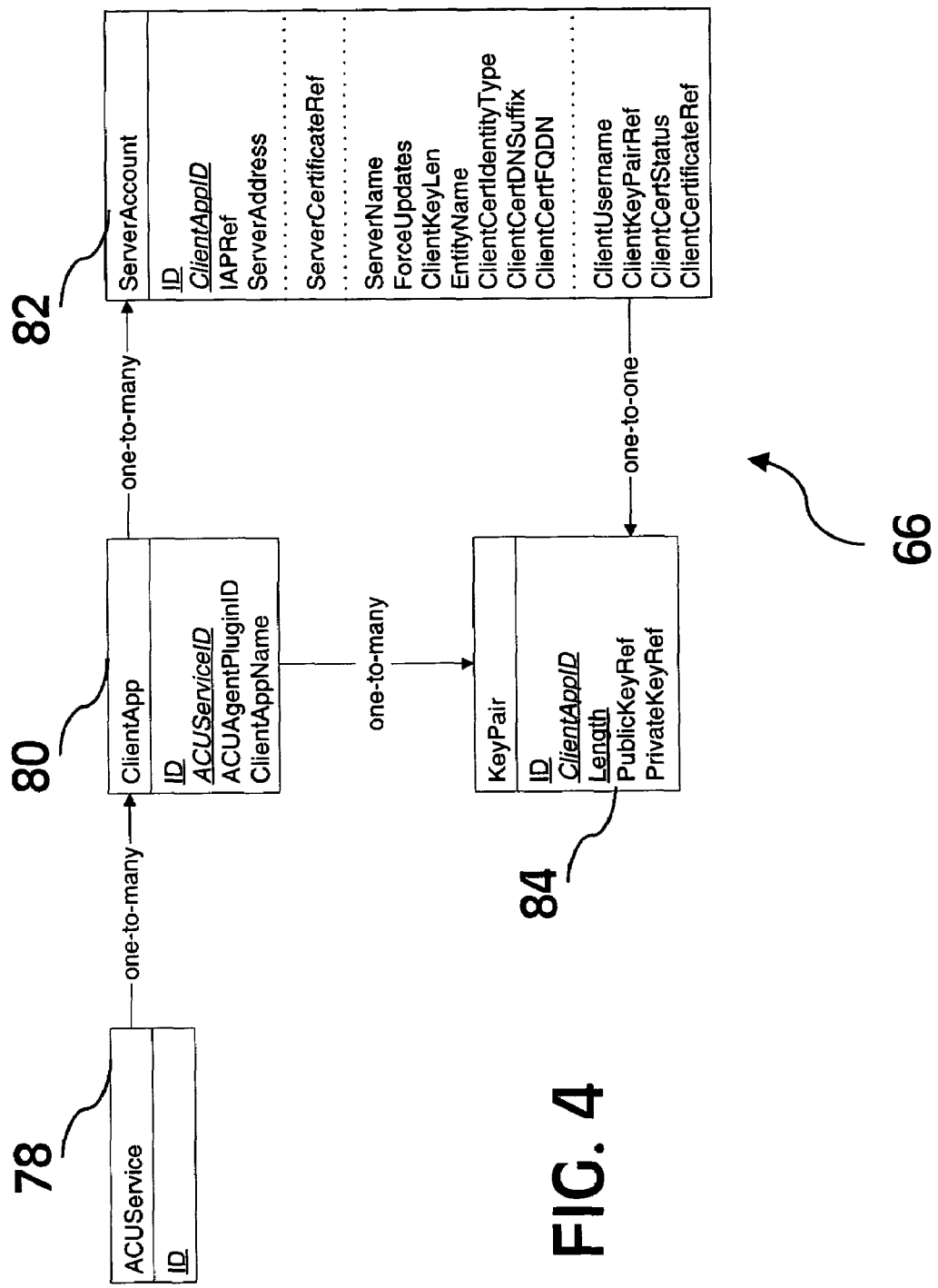
FIG. 4 is a block diagram showing storage of data in connection with Automatic Content Update client software in accordance with at least one embodiment of the invention.

FIG. 4 is a block diagram showing storage in ACU data storage 66. The ACUService record 78 contains information ("ID") about one or more ACU service instances. The ClientApp record 80 contains information about the applications that use a particular ACU service instance. More than one application can use a particular ACU service instance. ServerAccount record 82 contains information about the server accounts (e.g., for SSM server 20) used by a particular client application. The information in ServerAccount record 82 is obtained from user input, from the server (e.g., SSM server 20) in a client configuration package and/or as a result of a client initialization process. A particular application may have more than one ServerAccount record. Public/private key pairs are stored in KeyPair file 84. The different records and files may communicate with each other depending on the client application. The IAPRef field in the ServerAccount record 82 refers to an Internet Access Point (IAP) configuration entry in device 10. This field specifies the access point that is to be used when communicating with a server (such as SSM server 20) specified in the ServerAccount record. Other available IAPs for other uses are configured elsewhere in the device.

In one embodiment, ACU agent 74 and each application using the ACU client communicates during the content updating and certificate enrollment processes with IPSec manager 60. IPSec manager 60 is, in one embodiment, a part of operating system software on mobile device 10 (such as the SYMBIAN OS operating system). IPSec manager 60 manages IPSec policy storage 40, including the certificates and private keys stored therein. IPSec manager 60 also performs encryption and decryption operations with the private keys stored in the policy storage 42. In one embodiment, the private keys are installed and stored in encrypted form, and IPSec Manager 60 manages the policy import and VPN client passwords needed to decrypt and encrypt the private keys. The VPN client software, through IPSec manager 60 and/or other operating system components, implements dialogs to request VPN client and policy installation passwords from the user.

IPSec manager 60 further supports the generation and storing of public/private key pairs, the storing of certificates and the generation and storing of certificate requests for the VPN client software and for other applications. IPSec manager 60 assumes functionality required to support policy updating and certificate enrollment processes. When the user starts a policy updating process with a command to IPSec manager 60, IPSec manager 60 (through a user interface) asks for the VPN client password.

In one embodiment, the VPN client supports two principal types of VPN authentication: certificate authentication and legacy authentication. Certificate authentication is based on user public key infrastructure (PKI) data (e.g., a public/private key pair and corresponding certificate), while legacy authentication is based on usernames and passwords/passcodes.

The certificate enrollment process is available in two forms: automated and manual. The user initiates a automated certificate enrollment process by activating a policy that requires certificate enrollment. A policy requires certificate enrollment when it is a PKI policy and lacks all user PKI information, or when the user PKI information is incomplete or expired. The user initiates a manual certificate enrollment process by selecting a policy that requires certificate enrollment in the VPN client UI and then choosing a specific command from the client menu.

In one embodiment, profiles are created using a VPN policy manager application 26 and describe the VPN structure (e.g., network topology) to gateways and to clients. In one embodiment, VPN gateway 24 performs final checks of access rights, and a client version of a policy contains only information required to set up secure connections to correct gateways.

In some embodiments, policy manager application 26 includes user private keys and certificates with a policy. If a VPN profile defines the use of certificates and private keys, but does not contain them, a VPN client will create a public-private key pair and a corresponding certificate request and then send the request to a certification authority (CA) 28 for enrollment. If the enrollment is successful, the CA 28 sends back a certificate and the VPN client is ready for secure connections.

To facilitate the certificate enrollment process, one embodiment of SSM server 20 acts as a certificate enrollment gateway. In this case, VPN clients send enrollment requests to SSM server 20 instead of CA 28, and only SSM server 20 communicates with CA 28. SSM server 20 then performs the necessary authentication and authorization to make certificate enrollment fully automated. SSM server 20 authenticates users with a user database 98 or a remote authentication dial-in user service (RADIUS) server 30. The latter enables the usage of password tokens such as SECURID (available from RSA Security Inc. of Bedford, Mass.).

In some embodiments, SSM server 20 functions as an internal VPN certification authority. In such case there may be no need to use a third party CA to sign VPN certificates, which can result in significant cost savings in PKI-based VPN deployments.

VPN policies and profiles may change after they are initially deployed. Clients can update a policy from SSM server 20 in various ways. In one embodiment, the VPN client, using the ACU client, automatically checks for updated policies upon connection to SSM server 20. Upon finding updated policies, the VPN client (using the ACU client) automatically imports any changes. The ACU protocol is based on SyncML in one embodiment and cooperates with SYMBIAN OS-based VPN client software. Automatic updating minimizes the need for email notifications and browser-based downloads.

During the policy updating process, and regardless of whether policy activation succeeds or not, IPSec manager 60 sets a parameter that specifies whether policy updating has started. The setting is stored in an initialization file of IPSec manager 60 (not shown in FIG. 3). Next, IPSec manager 60 initiates the policy updating process for the activated policy by calling a corresponding ACU agent method and passing various parameters to it. Those parameters include the policy ID (as content ID) and the ID of an IPSec ACU plug-in (e.g., UID3 of the IPSec ACU Plug-in DLL). ACU agent 74 then loads the specified plug-in and uses the plug-in (not shown in FIG. 3) as an interface between ACU agent 74 and IPSec manager 60 to obtain the ID of the server (SSM server 20 in the example) with which the updating process is to be performed; the plug-in then implements the call from ACU agent 74 by calling IPSec manager 60. If the plug-in does not return a server ID to ACU agent 74, the updating process terminates. The process is also terminated if the client application record in the ACU data storage 66 does not have an associated server account record with the specified server ID. If the plug-in returns a valid server ID to ACU agent 74, the policy updating process continues.

Provisioning in Mobile Client UI

Figure 14:
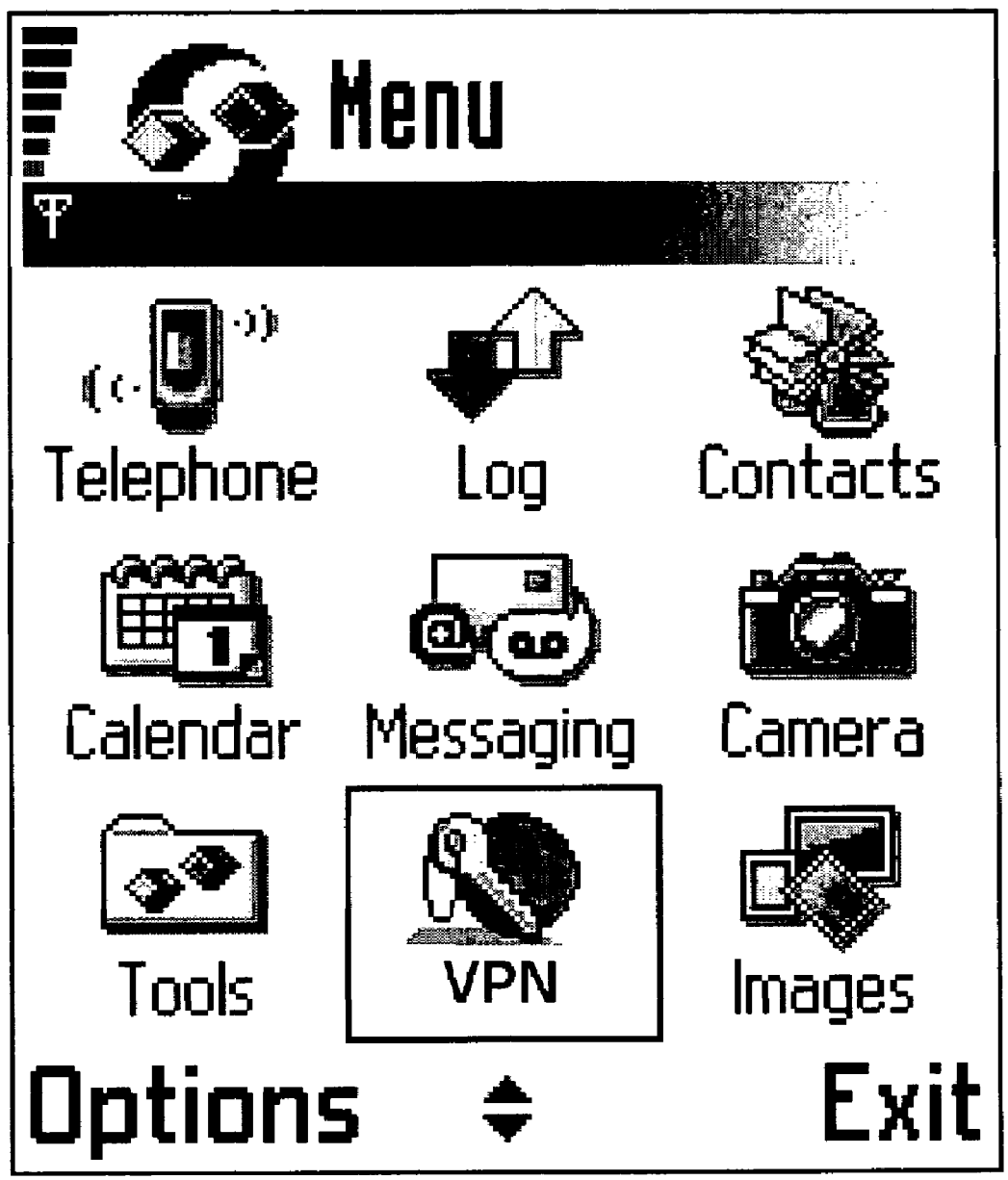
Figure 15:
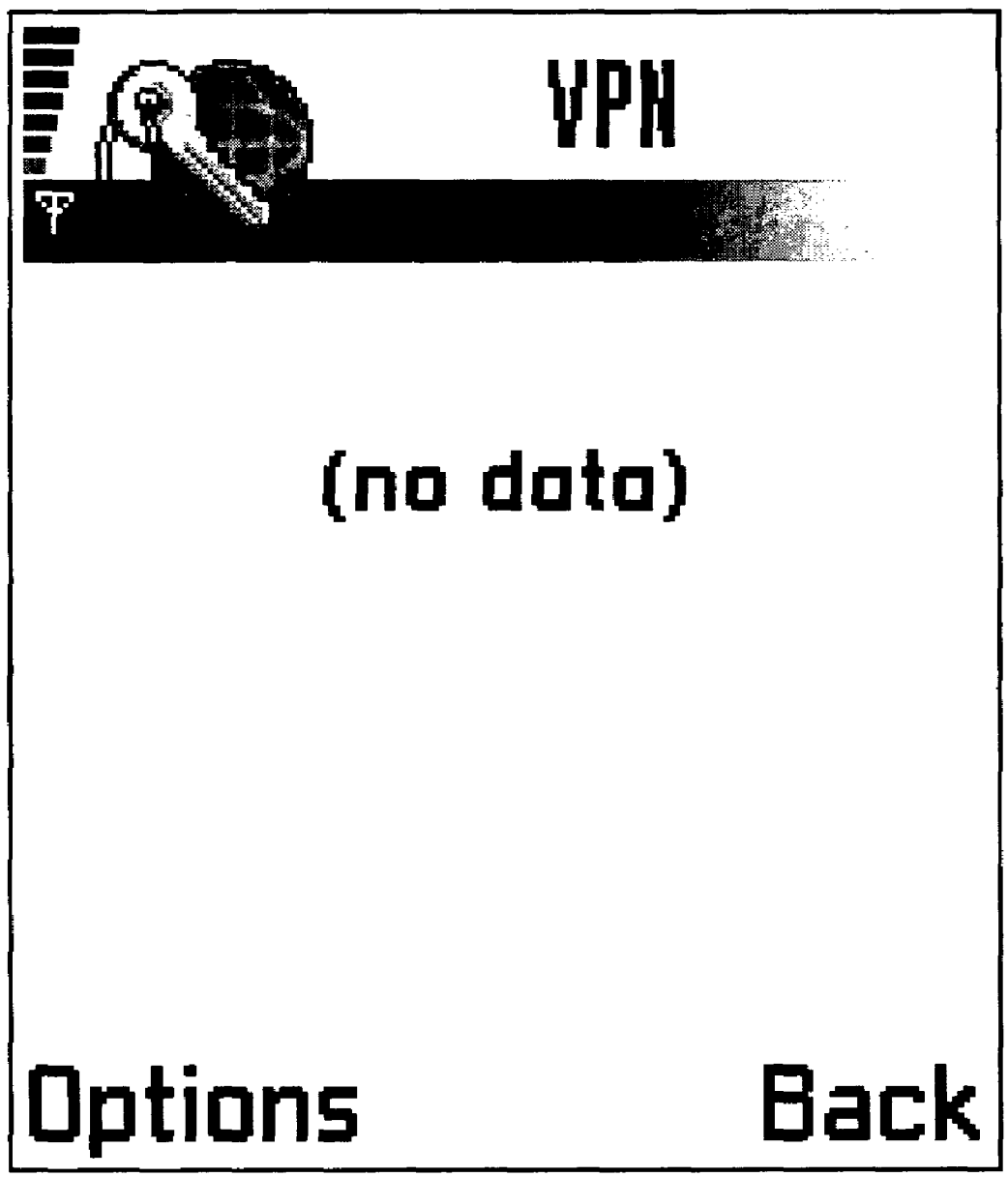

A user can initiate provisioning of mobile device 10 via a UI (e.g., moving a selection box on top of an icon and pressing a selection key, as shown in FIG. 14). In one embodiment, no data is displayed if there are no policies installed on the device (FIG. 15). In that embodiment, an options menu in a UI of mobile device 10 lists various functions a user can perform, and a back command returns a user to a main application menu.

Figure 16:
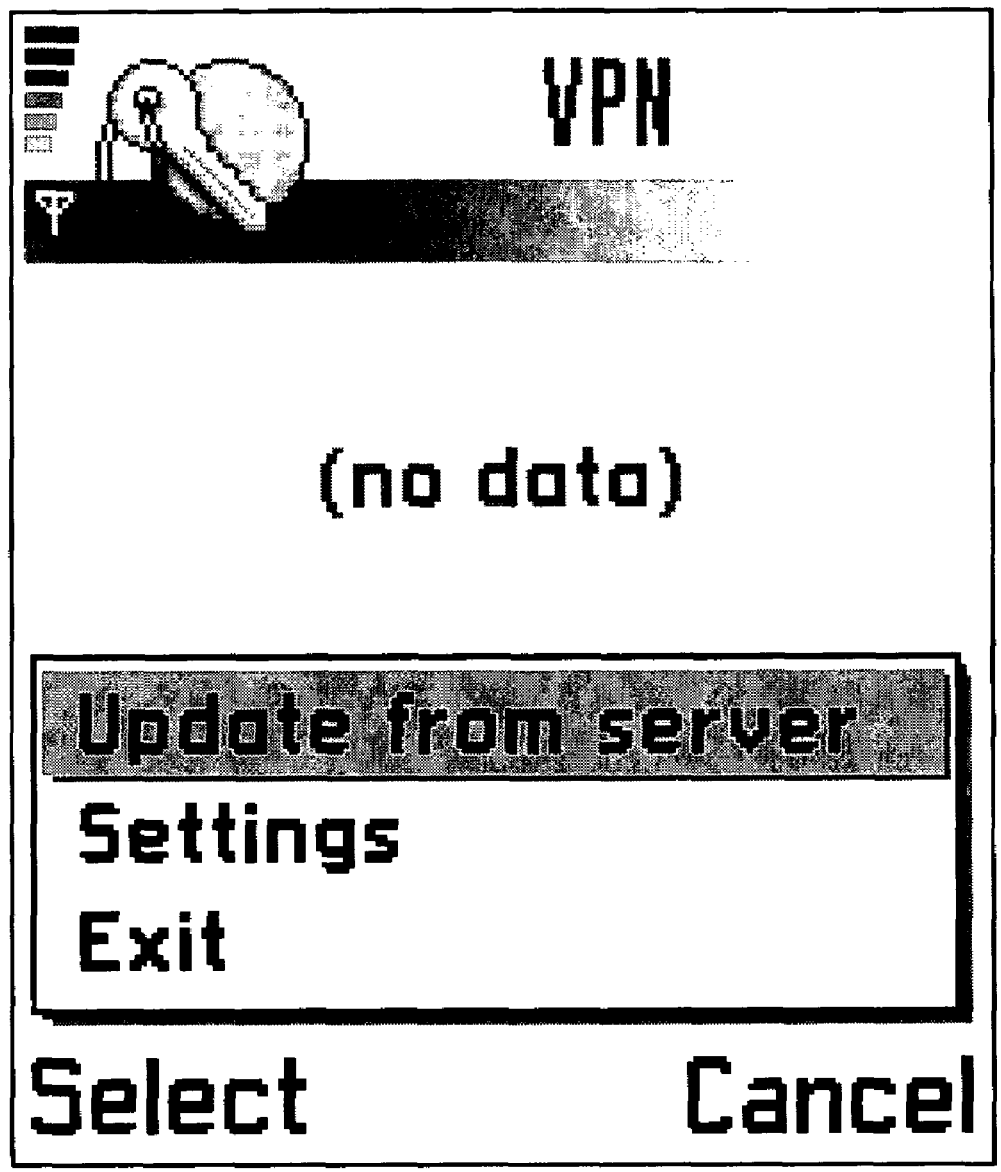
Figure 17:
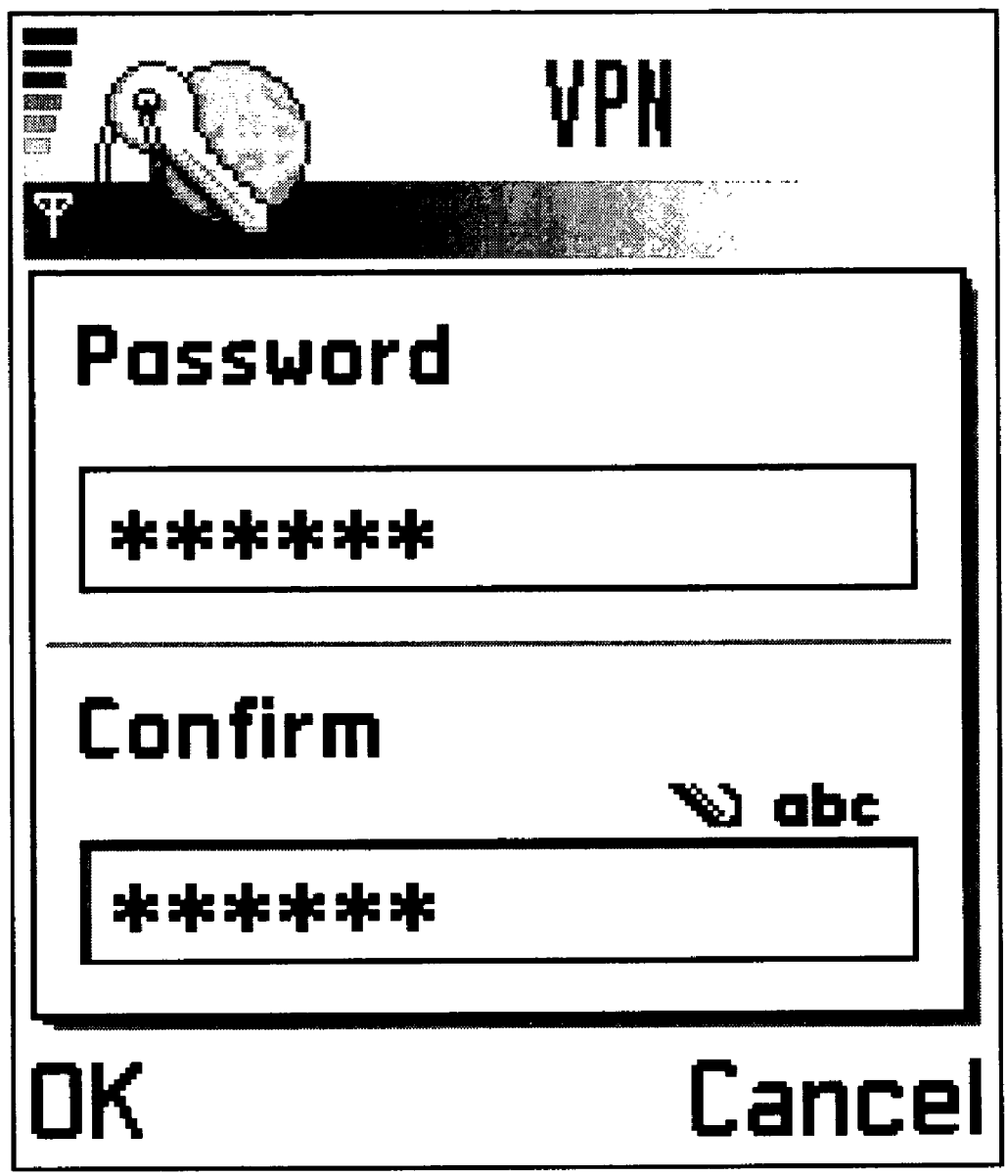
Figure 18:
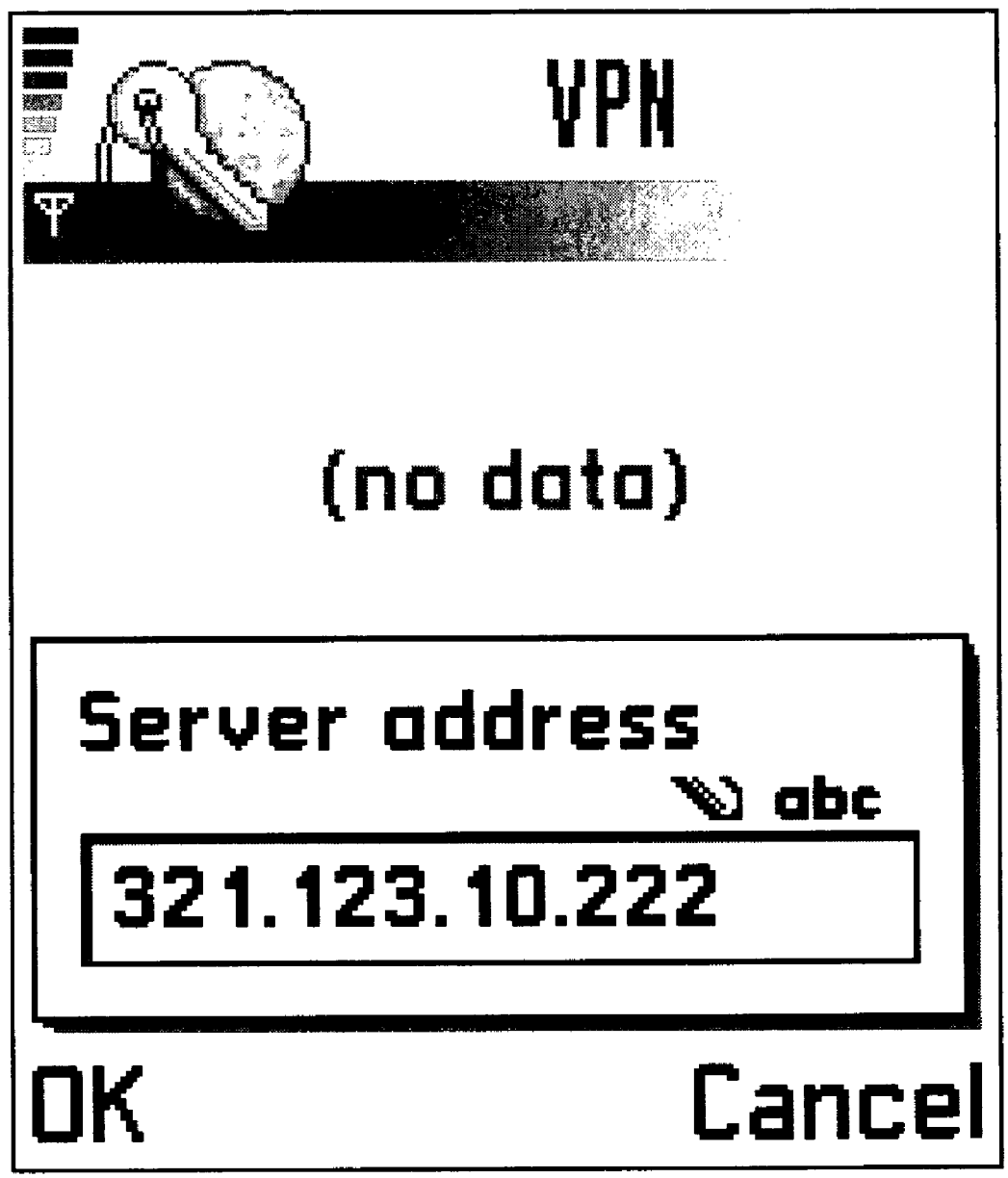
Figure 19:
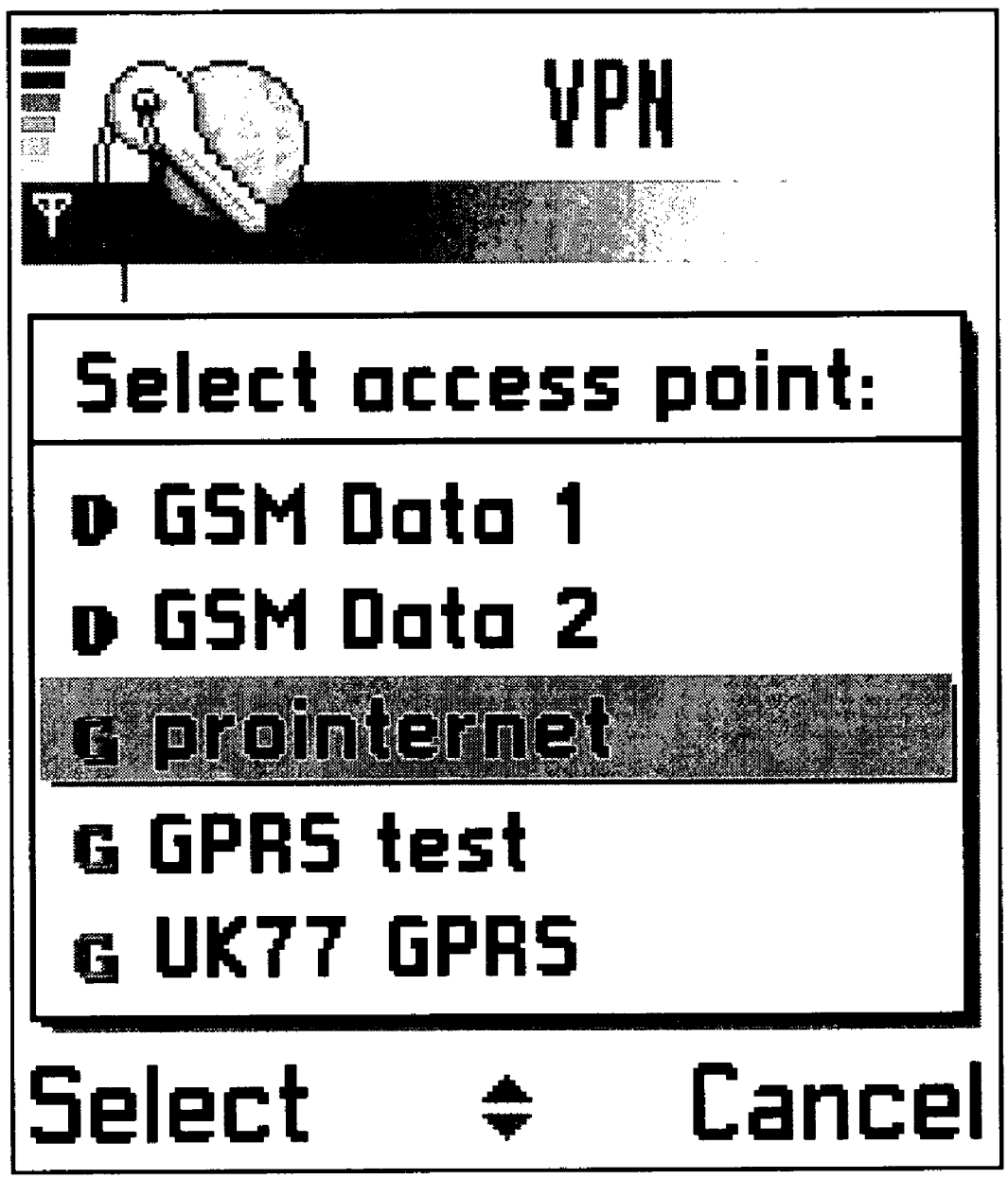
Figure 20:
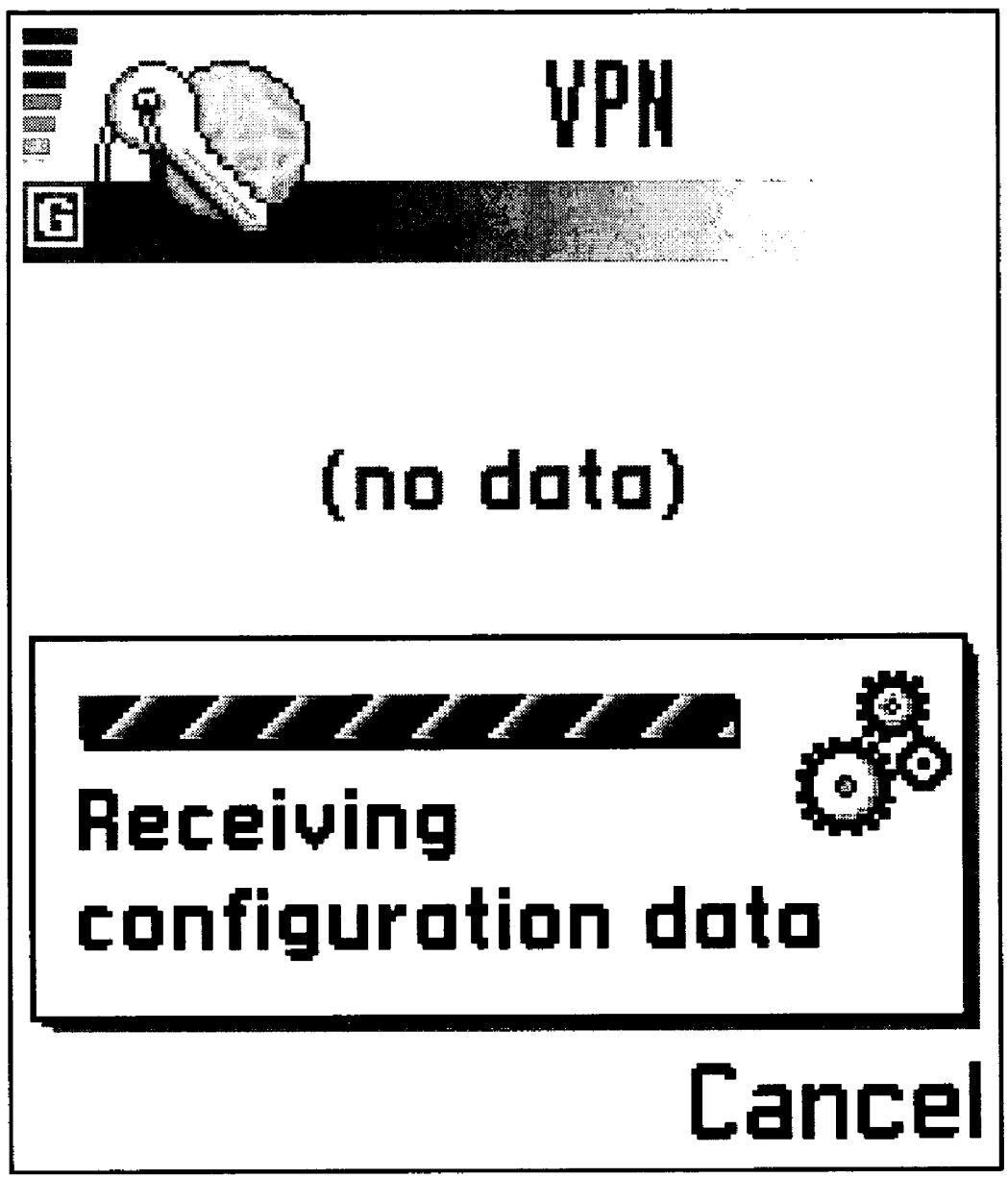

To obtain a first policy, a user connects to SSM server 20. From the Options menu, the user selects "Update from server" (FIG. 16) to start policy reception. Mobile device 10 connects to SSM server 20 and connection is protected by a VPN client password. If it is the first time the device is being used, a user may be required to create a VPN client password. During password entry, each character is shown for a moment before it changes to an asterisk (FIG. 17). Pressing "OK" after entering characters accepts the password and continues the process. Selecting "Cancel" returns a user to the client main screen. In next provisioning step the user enter the URL or IP address of SSM server 20 (FIG. 18). In one embodiment, the server address is delivered to the user by a corporate security or network manager. After entering "OK," the address is accepted and the process continues. As before, "Cancel" returns the user to the VPN client main screen. Next, the user selects an Internet Access Point (IAP) to connect to the Internet (or to a specific dial-up network)(FIG. 19). In one embodiment, the operating system displays a dialog when it detects that an application requests Internet access. "Select" accepts an Internet access point, and "Cancel" returns the user to the VPN client main screen. Next, mobile device 10 connects to SSM server 20. In one embodiment, a "G" in a box in the top left corner of a display informs the user that GPRS access is active in a mobile network (FIG. 20). If "Cancel" is selected the process terminates.

If a certificate for SSM server 20 and configuration information for the VPN client are not present (or are invalid), the client initialization process fetches a client configuration package from SSM server 20 (FIG. 20). Without an existing SSM server certificate in the ACU data storage 66, ACU agent 74 cannot automatically trust the response and the server that sent it. To establish trust, ACU agent 74 asks the user to enter a server identity code. In one embodiment, software on mobile device 10 prompts the user to enter numbers from a 16 byte identification code or "fingerprint" of an incoming certificate, and displays the remaining numbers for the user to verify against the full fingerprint. For example, a fingerprint code may be of a form, e.g. "12qwe34rtyqwe1234". When verifying the server, the user is shown an incomplete code or string, e.g. "12qwexxrtyqwexx34", where "x" depicts a missing character. To verify the server, the user must then enter "34" in the first two x's and "12" in the last two x's. The mobile device 10 calculates a fingerprint of the certificate received during the connection and converts it to a readable string; the device then removes (e.g., changes to "x", "_", etc.) one or more randomly selected characters from the string and displays the modified string to the user. The random character selection can be tailored to the capability of a mobile device. For example, in a mobile phone with a small keypad, only digit characters are randomly removed. The device capabilities may be determined by, e.g., the IMEI code for the device. The number of missing characters in the string may also vary. The positions of the randomly removed characters within the fingerprint are different for different access attempts. ACU agent 74 compares the user-entered digits or characters to the characters removed from the 16 bytes of the received SSM server certificate's fingerprint. If the code matches the fingerprint, i.e. the user-input characters match the characters removed from the server fingerprint, ACU agent 74 assumes that SSM server 20 can be trusted and stores the server certificate to the certificate file 48 in IPSeq policy storage 40 by calling IPSec manager 60. The connection to SSM server 60 is then allowed to continue.

Figure 21:
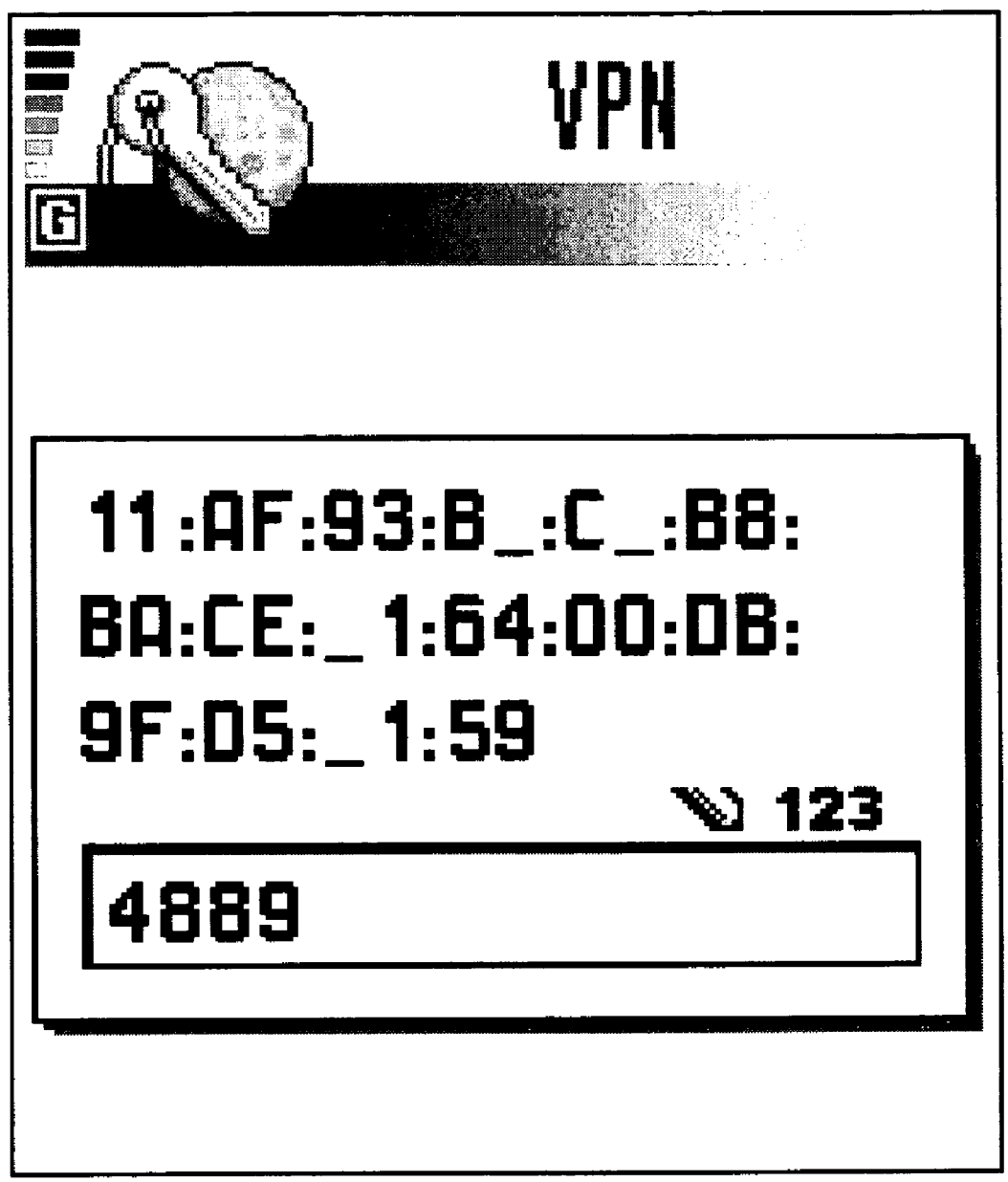

Another example of the foregoing procedure is shown in FIG. 21. SSM server 20 creates a hash of the server's certificate and sends that hash to mobile device 10 as a fingerprint. In the example of FIG. 21, the fingerprint is the 16 byte hexadecimal value 11:AF:93:B4:C8:B8:BA:CE:81:64:00: DB:9F:D5:91:59. Prior to policy provisioning, a network administrator provides the user of mobile device 10 with the fingerprint in a secure manner, e.g. by mailing a card having the fingerprint imprinted thereon. Mobile device 10 calculates the fingerprint (e.g., the hash of the certificate) and displays the fingerprint with four randomly-selected characters replaced with blanks ("_"). The user then enters the four missing characters. The user is thereby prevented from accepting the certificate without actually verifying it.

Using the foregoing procedure, a user verifies the certificate of a server to ensure that the user is connecting to a legitimate server, and not a hostile server (such as a server pretending to be the desired server). This verification is done by comparing the previously published fingerprint of the certificate against the fingerprint calculated from the certificate received from the server.

As indicated, the fingerprint code for SSM server 20 is provided off-line (prior to provisioning) to the user in various embodiments. The server's administrator publishes the certificate's fingerprint in some way which cannot be changed by attackers (e.g., a company newsletter, personal delivery, regular mail, etc.). The user's client software calculates the fingerprint and then it displays the fingerprint to the user with random characters replaced with blanks (or other characters) and asks the user to enter the missing characters. To be able to do this the user must verify the shown incomplete fingerprint against the published fingerprint. If he can enter the valid characters, then he also has verified that the fingerprint is a correct one (otherwise he would not have known the missing characters).

In at least one embodiment, the VPN client substantially simultaneously (and without user interaction) requests a certificate from SSM server 20 whenever connecting mobile device 10 to a corporate network (such as the intranet of FIG. 2). In other words, the VPN client software adds the above-described certificate validation process to every server access attempt.

An embodiment of the invention allows users to confirm connection to a secured device when obtaining high-speed Internet service from home, hotels, airports, cafes, etc. For example, a user may be traveling and wish to connect mobile device 10 to a high-speed Internet access point at a location being visited. A fingerprint of a certificate for such an access point is delivered through trusted media to everyone wishing to use the access point. In a hotel, the fingerprint could be provided by a front desk clerk. The fingerprint could also be mailed to a user. The fingerprint could be publicly displayed in trusted environment that cannot be easily altered, such as an encased or difficult to reach bulletin board. Similar to the procedure outlined above, mobile device 10 could then, as part of connection to the high-speed access point, require the user to supply characters of the fingerprint.

In some embodiments, and as previously indicated, the fingerprint of a certificate is calculated from the certificate itself, such as through a hash function.

Figure 22:
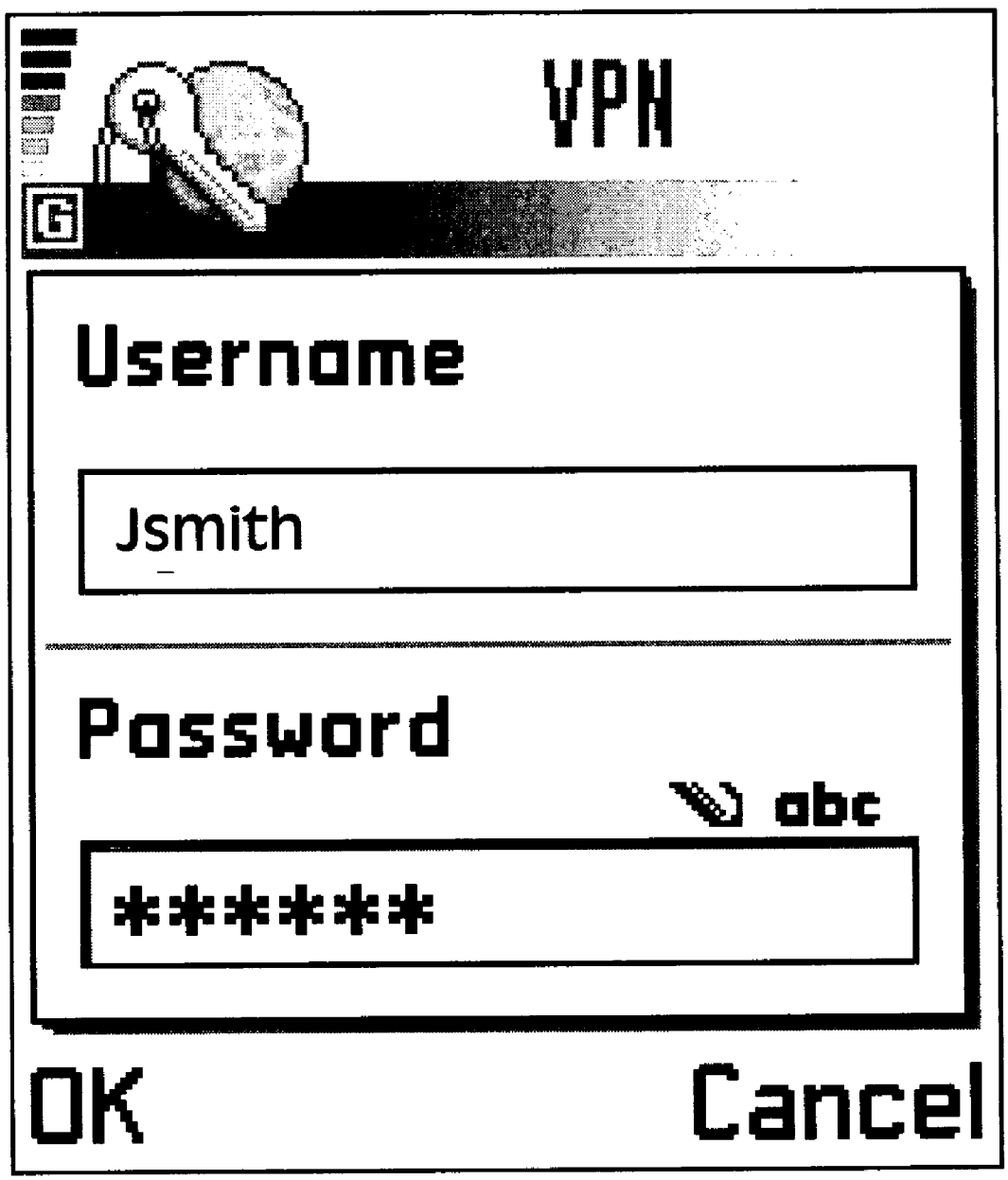
Figure 23:
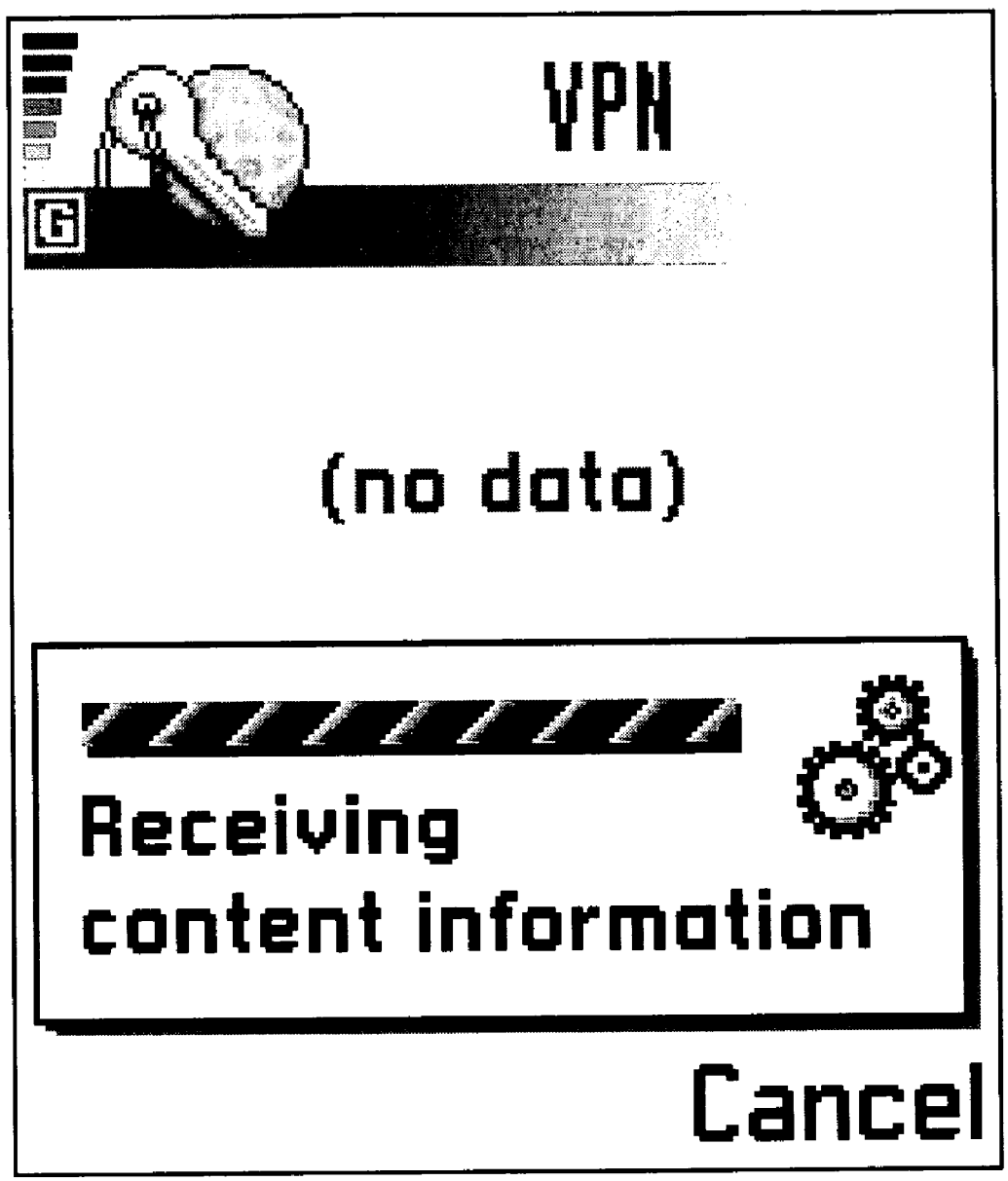
Figure 24:
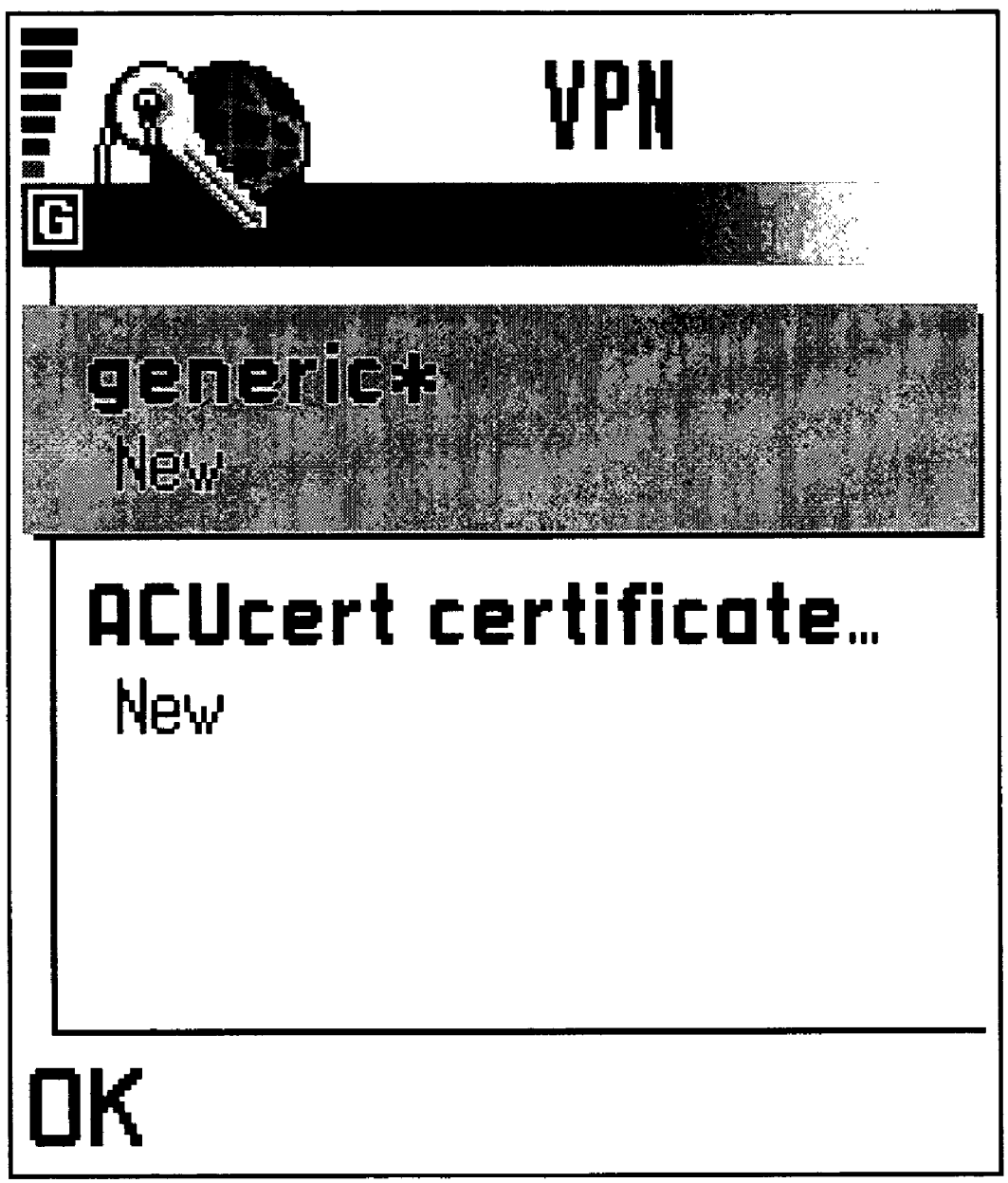
Figure 25:
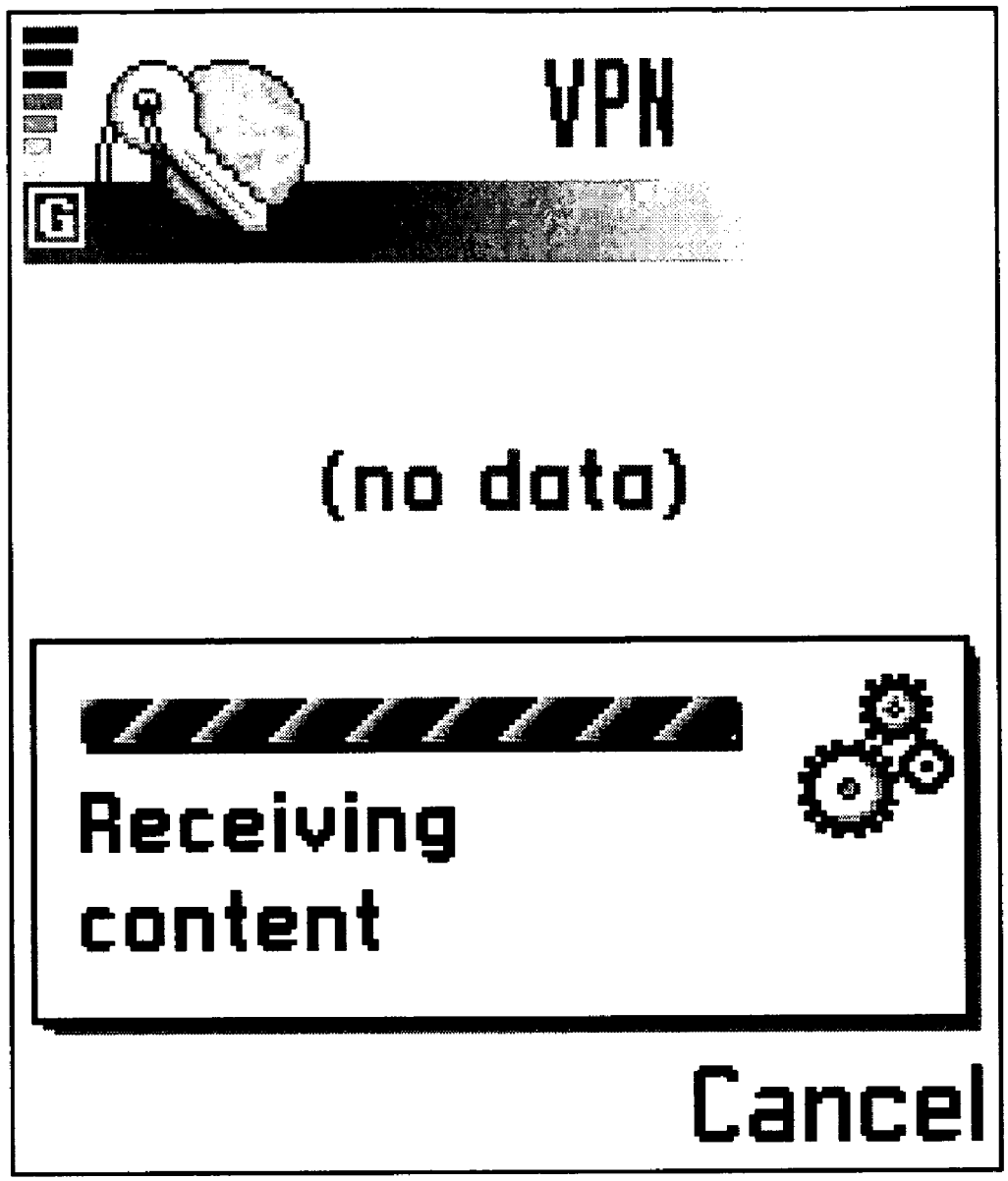
Figure 26:
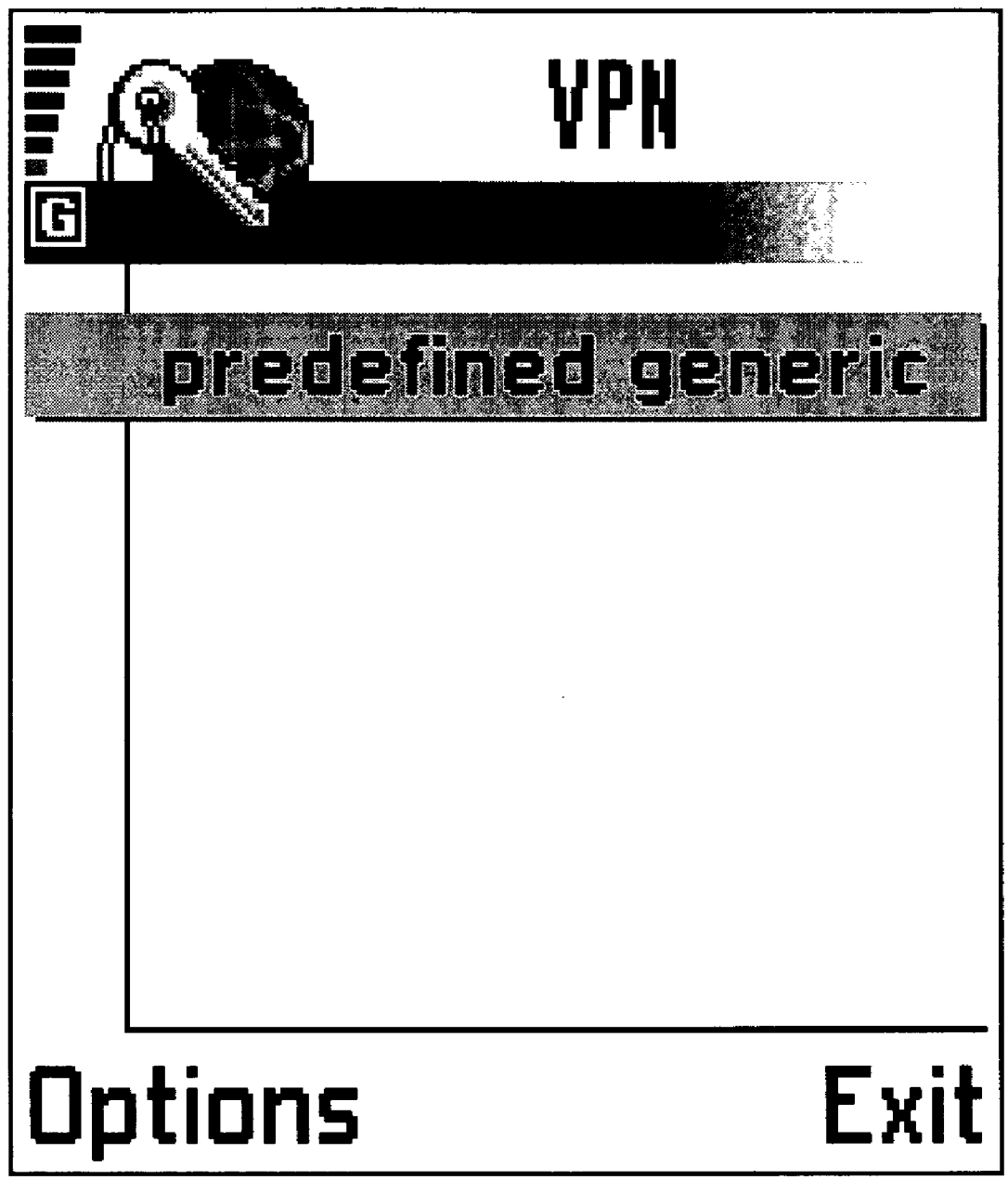

After the user of device 10 verifies the certificate of SSM server 20, SSM server 20 requires the user to verify that the user is who he or she claims to be, and that an account has been established for him or her. The user is prompted to enter a user name and password for access to SSM server 20 (FIG. 22). In some embodiments, tokens or one time passwords could be used. After SSM server 20 and device 10 are authenticated to one another, device 10 stores the SSM server 20 certificate and receives information about available content (FIG. 23). ACU agent 74 stores a reference to a received certificate in the server account record 82 (FIG. 4) of the ACU data storage 66 (FIG. 3) along with other client configuration information received from SSM server 20. The user gets a list of available content (FIG. 24) that (in the example) includes a new VPN policy ("generic*") from VPN policy manager application 26, as well as an ACU certificate ("ACUcert"). The ACU certificate is a device certificate for the user that is used to authenticate device 10 to SSM server 20. Device 10 downloads the content (FIG. 25). When content download is complete, device 10 shows the available VPN policies (FIG.

26; no certificates are shown). The user can now use the new policy(ies) by connecting to a VPN gateway.

At this point, device 10 has received a policy that requires certificate enrollment. In other words, the policy does not yet have an attached certificate which can be used for authentication. If a client certificate is not in place or is invalid, the client initialization process continues with client certificate enrollment.

Figure 27:
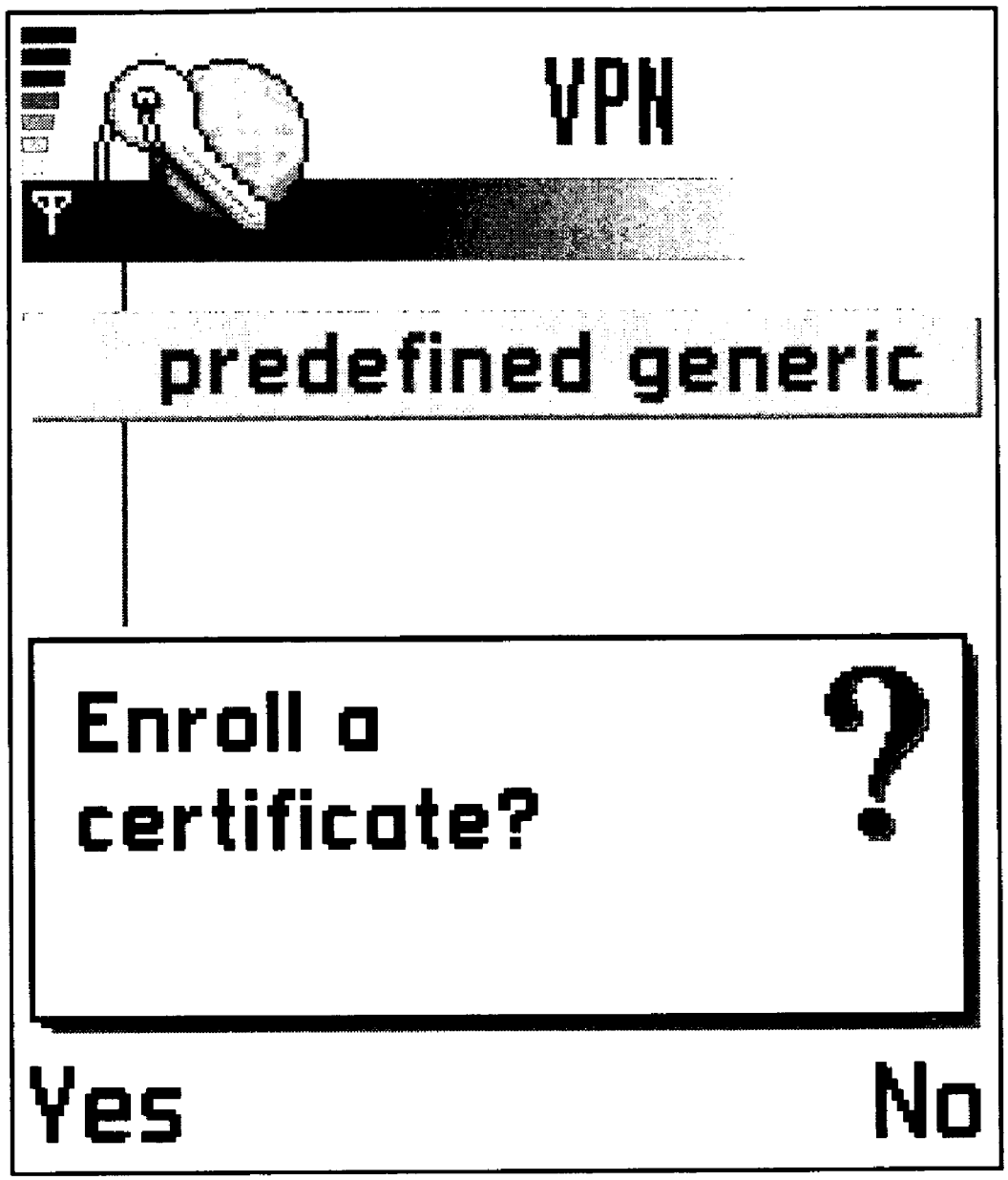
Figure 28:
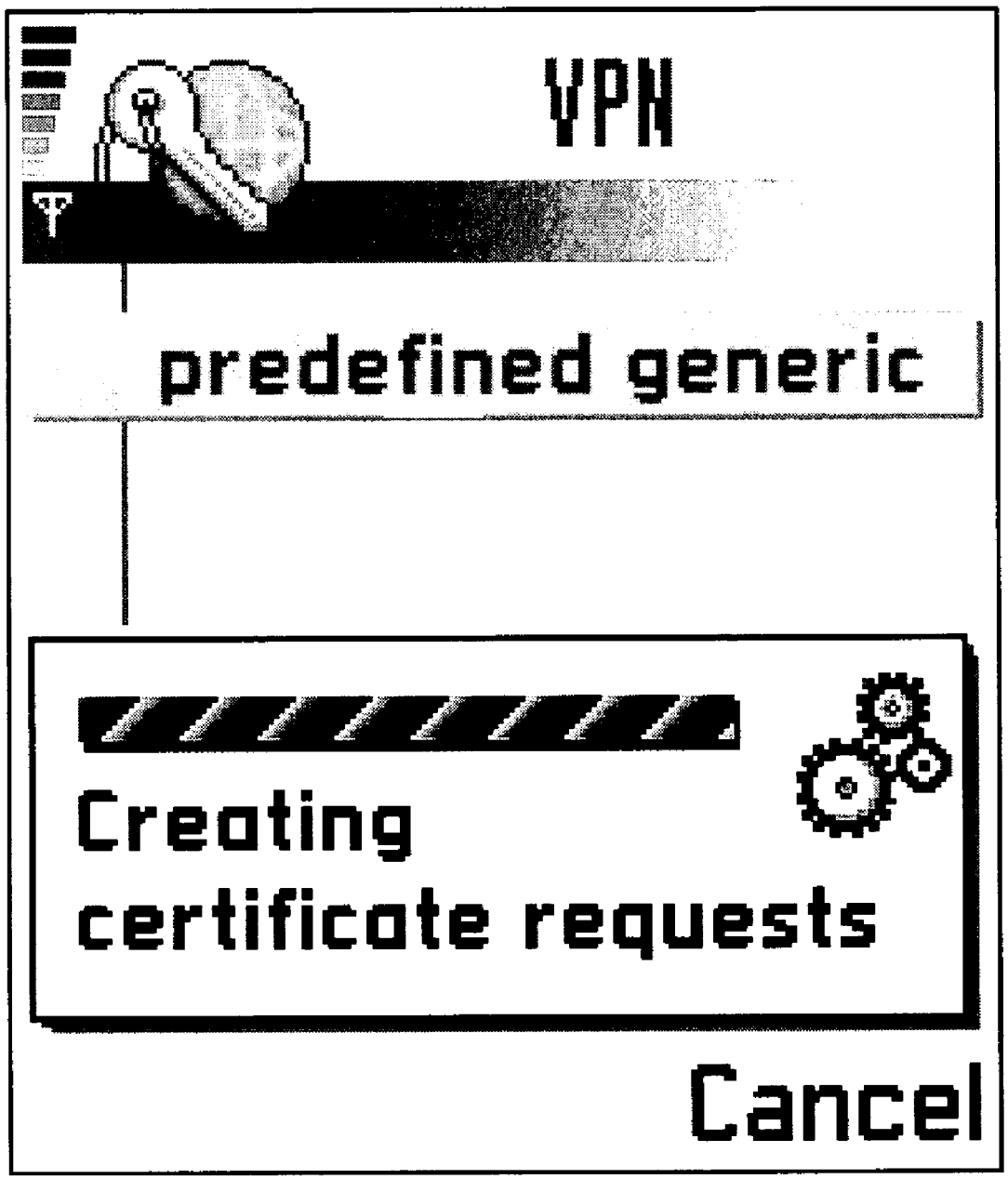

The VPN client of device 10 first checks whether the VPN policy is a certificate authentication policy, and whether a certificate is attached to the policy. If the policy does not contain a valid certificate, the user is asked if he or she wishes to enroll a certificate (FIG. 27). Upon selecting "yes," the user is presented with a UI indicating generation of a certificate request (FIG. 28). This starts with the generation of a public/private key pair for the client application, unless a key pair of the required length has already been created. In one embodiment, all server accounts that ACU agent 74 creates for a client application use the same set of key pairs. The set includes a single key pair of each different key length required by the servers. Key pairs are generated by calls to IPSec manager 60. The length of generated keys is determined by a parameter included in client configuration information fetched from SSM server 20 and stored in the corresponding ServerAccount record 82 in ACU data Storage 66.

Next, ACU agent 74 may request legacy authentication information (username and password) from the user (not shown). The legacy authentication information is used to authenticate the certificate enrollment request sent to SSM server 20. In addition, the specified username may be combined with user identity information contained in a client configuration package, or a message transaction used to download an ACU client configuration package (e.g., the ACU client certificate used in subsequent ACU communications) to the ACU client, to form the user identity to be used in the Client certificate.

Once the username has been asked, the key pair is ready and the returned key pair identifier stored to the appropriate ServerAccount record 82 in ACU Data Storage 66, ACU agent 74 obtains a privacy enhanced mail (PEM) encoded PKCS#10 certificate request for the generated key pair and supplied user identity by calling IPSec manager 60. In the case of a client certificate, the challenge password attribute in the certificate request is left empty. IPSec manager 60 then checks whether the asked certificate request already exists (e.g., is cached) in IPSec policy storage 40. If the request does not exist, IPSec manager 60 creates it by using a PKCS#10 module (not shown in FIG. 3).

Figure 29:
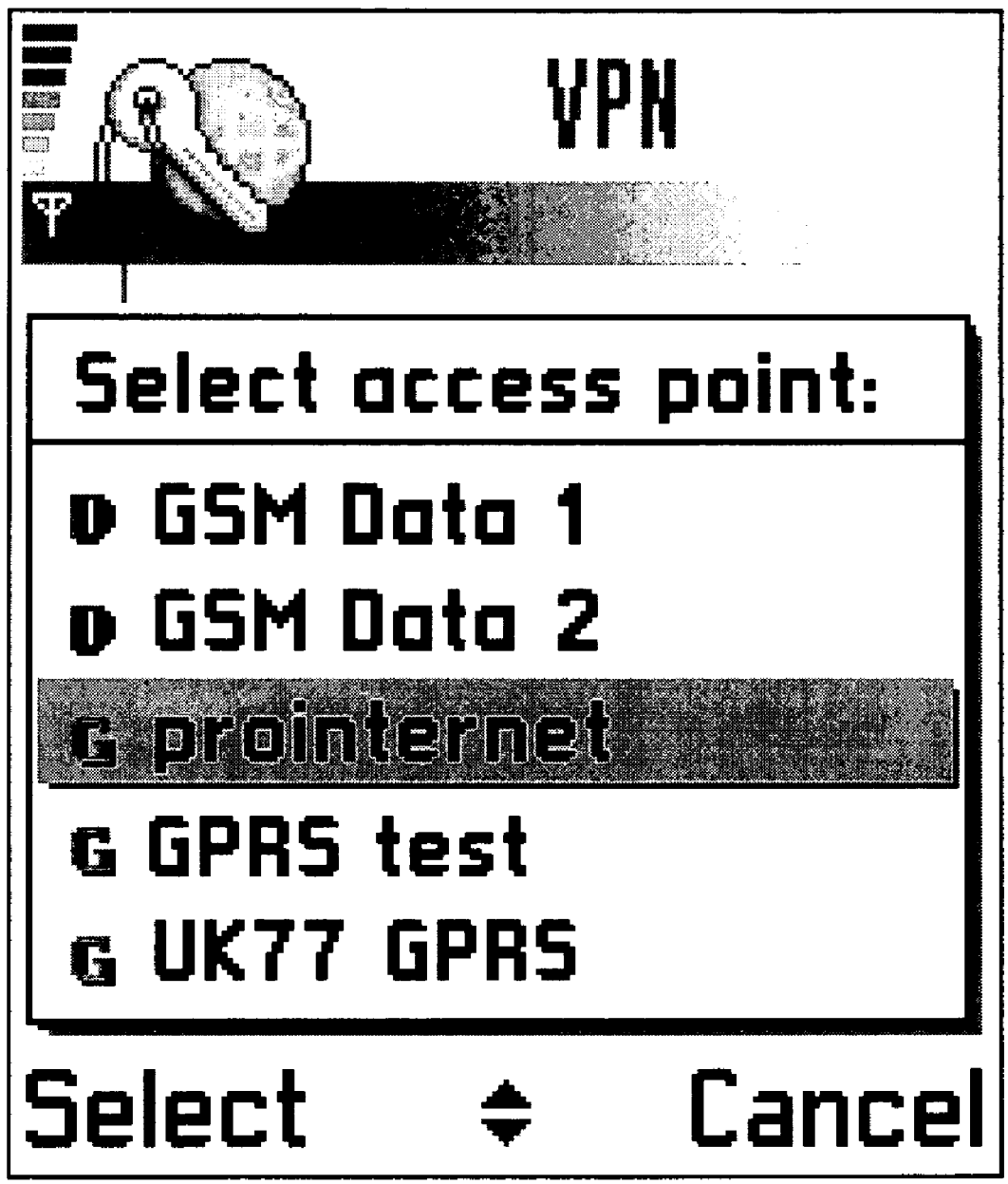
Figure 30:
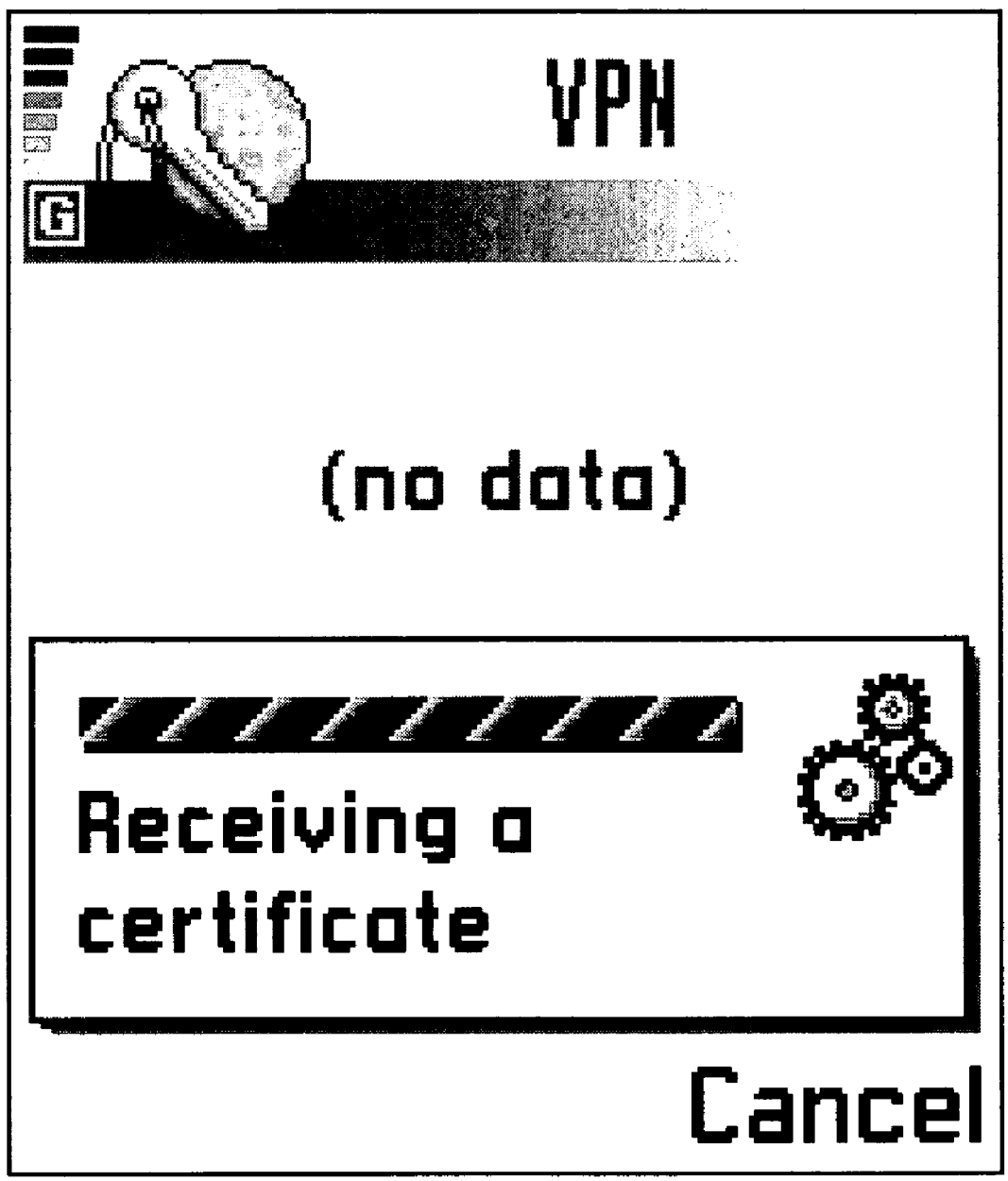

After creating the certificate request, IPSec manager 60 stores (caches) the request to IPSec policy storage 40. The request cache is used to avoid the re-generation of certificate requests whose enrollment completes one or more times with a pending status. ACU agent 74 then constructs an ACU request message containing the PKCS#10 request. Device 10 then sends the message to SSM server 20 for certificate enrollment. The user is prompted to select an Internet access point (FIG. 29). ACU agent 74 then stores the returned enrollment status (success, failure, pending) to the appropriate ServerAccount record 82 in ACU data storage 66. FIG. 30 shows a UI indicating receipt by device 10 of a certificate. If the certificate enrollment is successful, ACU agent 74 stores the returned client certificate to IPSec policy storage 40 by calling IPSec manager 60. ACU agent 74 also stores a reference to the saved certificate to the appropriate ServerAccount record 82 in ACU data storage 66. If SSM server 20 returns a certificate enrollment return code indicating success or failure (i.e., not a pending request), ACU agent 74 deletes the corresponding certificate request from IPSec manager 60.

The automated certificate enrollment process is initiated when a user activates a policy via the IPSec UI. The policy activation request flows from the IPSec UI to the IPSec application programming interface (API) and further to IPSec manager 60. If IPSec manager 60 determines that the policy being activated requires certificate enrollment, it returns a corresponding return code to the IPSec API without activating the policy. On receipt of a return code indicating need for certificate enrollment, the IPSec API stops the policy activation process and returns the return code to the IPSec UI. On receipt of a return code indicating need for certificate enrollment, the IPSec UI first launches a confirmation dialog allowing the user to accept or reject the forthcoming enrollment process. If the user accepts the enrollment, the IPSec UI continues by opening a progress dialog that will be shown as long as the enrollment process continues. The progress dialog also allows the user to stop the ongoing enrollment process. In one embodiment, the VPN client password is asked at initiation of the policy activation process (before the above confirmation and progress dialogs) and is not asked again during the certificate enrollment process.

The user can move to other applications while the certificate enrollment process continues. The progress dialog is only visible in the IPSec UI, but dialogs requiring user interaction during the updating process appear on top of other applications the user is accessing.

After the user reaccepts enrollment in the IPsec UI, the enrollment process continues by call to ACU agent 74 to perform automated certificate enrollment for the specified policy. The call includes as parameters the ID of a plug-in to be used in the enrollment process (e.g. an IPSec ACU Plug-in, or interface to IPSec manager 60 for ACU agent 74) and the ID of the policy for which certificate enrollment is to be performed. From the point of view of ACU agent 74, the policy ID is a client-specific parameter, e.g., a user of device 10 may belong to many groups (discussed below), but the user has one policy ID. Next, ACU agent 74 calls the IPSec ACU Plug-in to return a list of enrollment servers for the policy. The IPSec ACU Plug-in implements the call by calling IPSec manager 60. A server address in the returned list indicates the server (e.g., SSM server 20) where the one or more certificate requests are to be sent. However, a single VPN policy can refer to multiple certificates and each certificate can be enrolled with a different server.

Next in the enrollment process, ACU agent 74 takes the returned server addresses, one at a time, and checks whether communication with the respective server is properly initialized. If not, ACU agent 74 asks the user to select the IAP to be used for communicating with the server (e.g., FIG. 29). Then, ACU agent 74 performs a client initialization process for the server. Once communication with the server is properly initialized, ACU agent 74 calls the plug-in to return the certificate requests for the specified policy-server combination. The ACU identity associated with the server (e.g., SSM server 20) is also included in the call.

When IPSec manager 60 receives a request to create and return certificate requests for a certain policy, it handles the request. Each certificate request in the list returned to ACU agent 74 by IPSec manager 60 includes a PEM-encoded PKCS#10 certificate request and a request identifier. Request identifiers are defined by client applications and passed back to the applications (through the corresponding ACU interfaces) in enrollment responses. In the case of the VPN client, the request identifier is a combination of subject identity and key pair information that the VPN client can use to find the policy and host with which a certain enrollment response is associated. ACU agent 74 then creates an ACU request message comprising all certificate requests aimed at a certain server and sends the request message.

When a response is received from a server, ACU agent 74 parses the response and passes the returned certificate enrollment responses, one at a time, to the IPSec ACU Plug-in. The plug-in passes the responses further to IPSec manager 60.

An enrollment response comprises a policy ID, a certificate request ID and a status code, and may include a certificate. The certificate is present only if the status code indicates a successful enrollment. A certificate is missing if the status code indicates a failure or that the enrollment request is pending.

When the IPSec Manager 60 receives an enrollment response, it stores the certificate (if returned) to IPSec Policy Storage 40 and saves the enrollment status to the corresponding enrollment information field in the VPN policy file 46. The corresponding enrollment information field is found according to the returned certificate request identifier.

If the enrollment status code indicates success or failure but not a pending request, IPSec Manager 60 deletes the cached certificate request from IPSec Policy Storage 40.

When ACU agent 74 has processed all certificate requests returned by the IPSec ACU Plug-in for a certain policy and passed the returned certificates back to the plug-in, it returns a success/error code to the IPSec API that initiated the certificate enrollment process. The IPSec API then returns the code to the IPSec UI.

If the IPSec UI receives an error return code as a response to a certificate enrollment call, it shows a dialog advising the user that the enrollment failed and that the policy cannot be activated. If the IPSec UI receives a success return code, it shows a dialog advising the user that the enrollment succeeded and that the policy can now be activated. In this dialog, the user can let the policy be activated or cancel the activation. If the activation continues, the VPN client password is not requested again, as it was obtained before the enrollment process was started.

Activating a Policy

Figure 31:
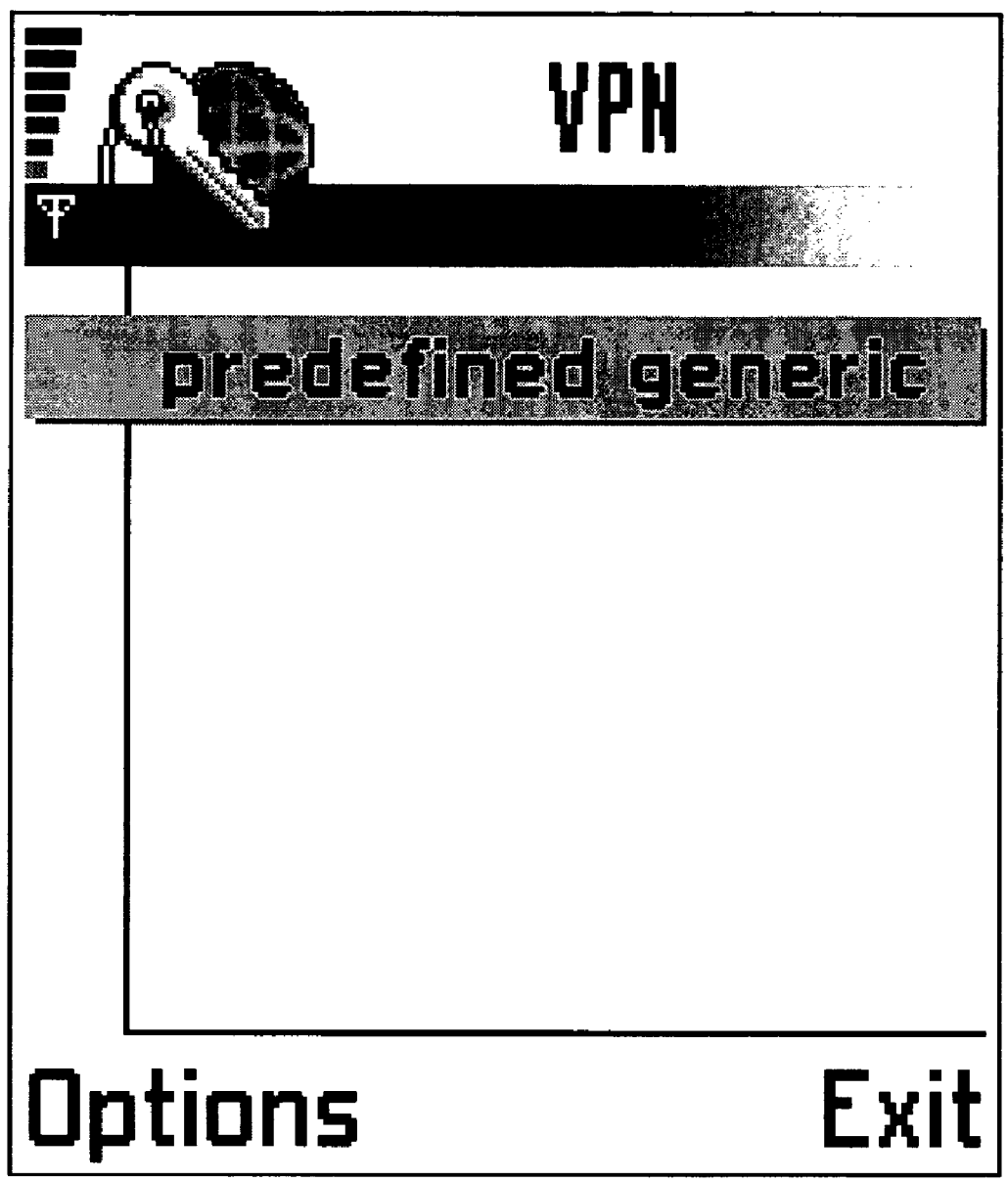
Figure 32:
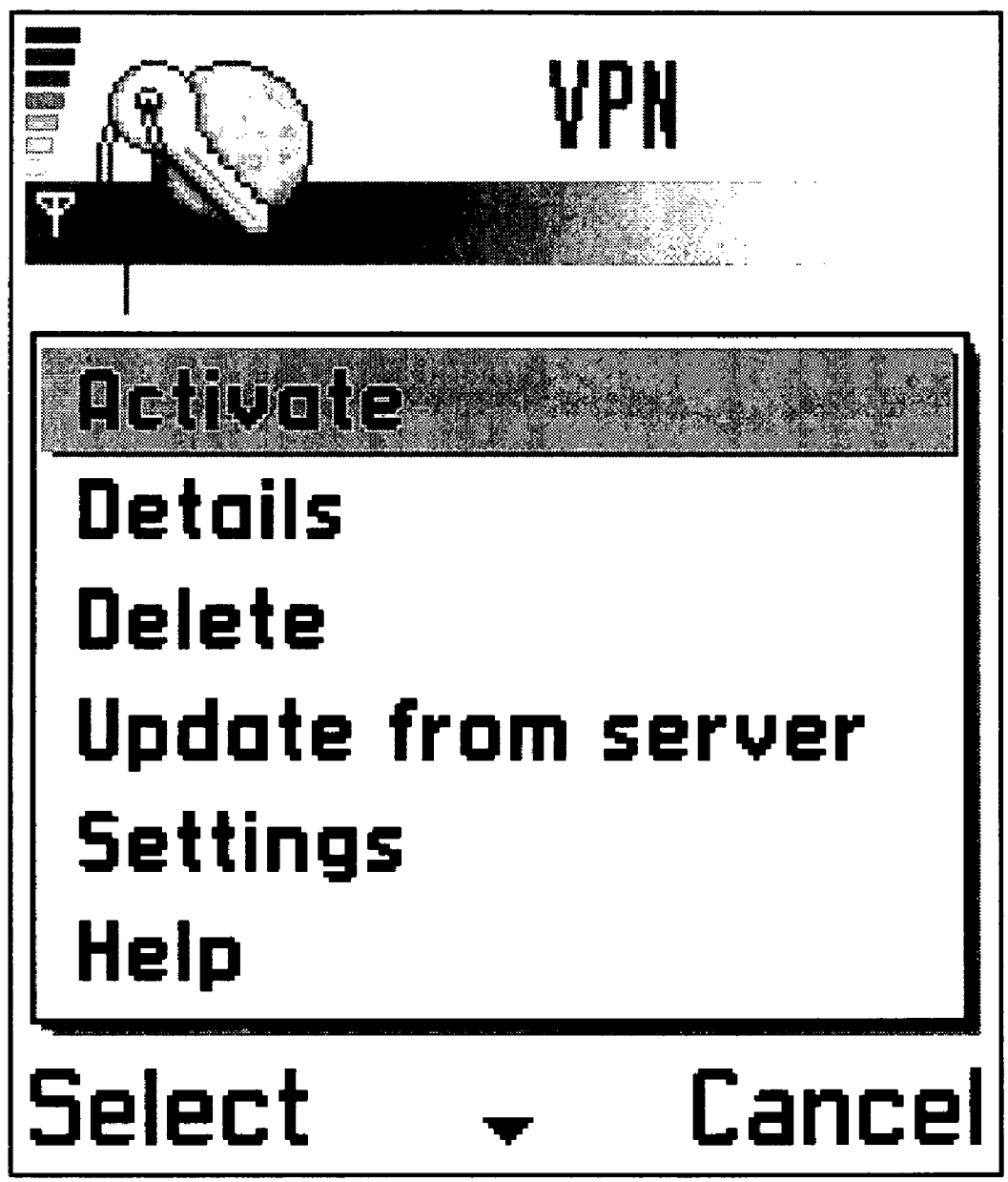
Figure 33:
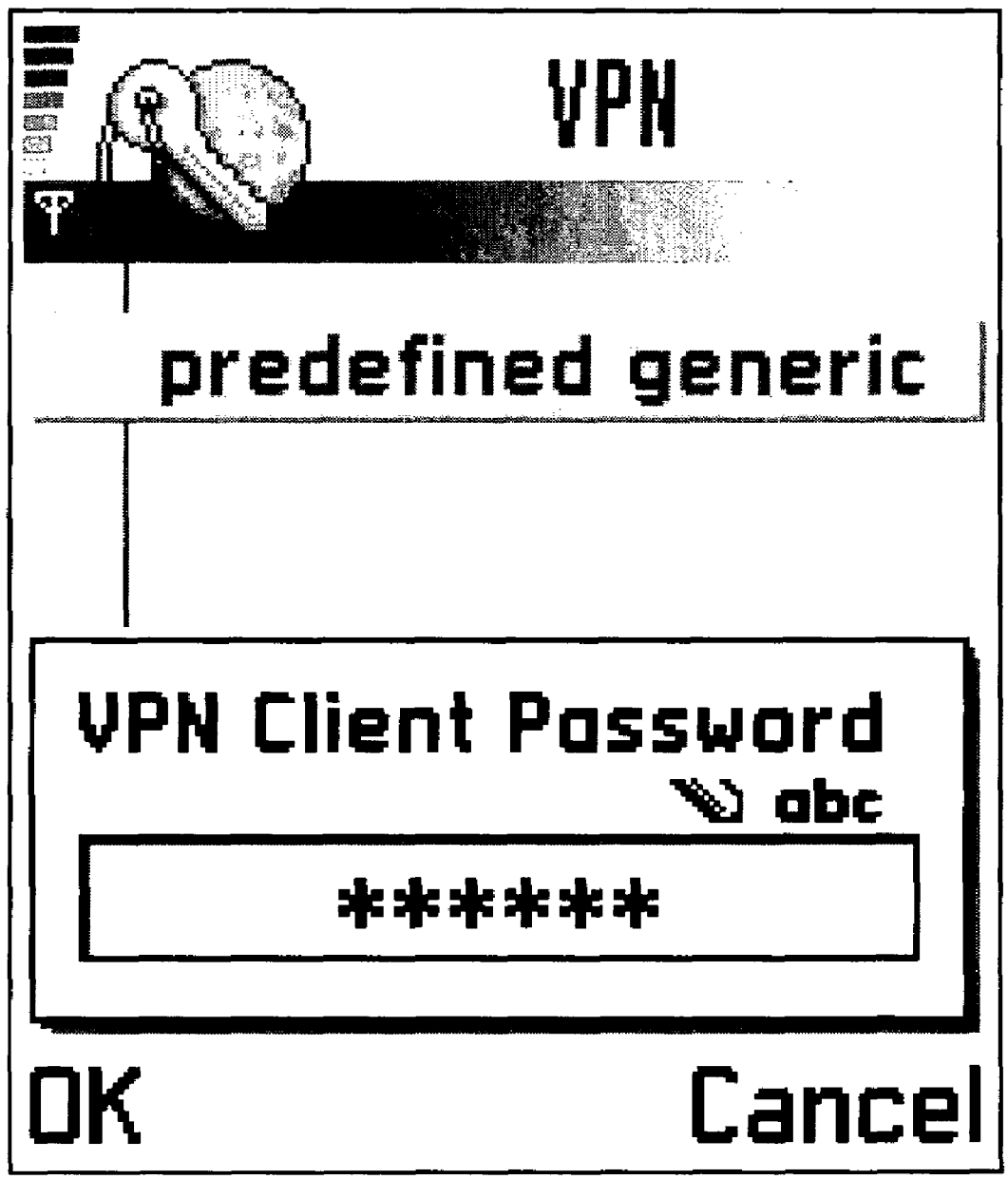
Figure 34:
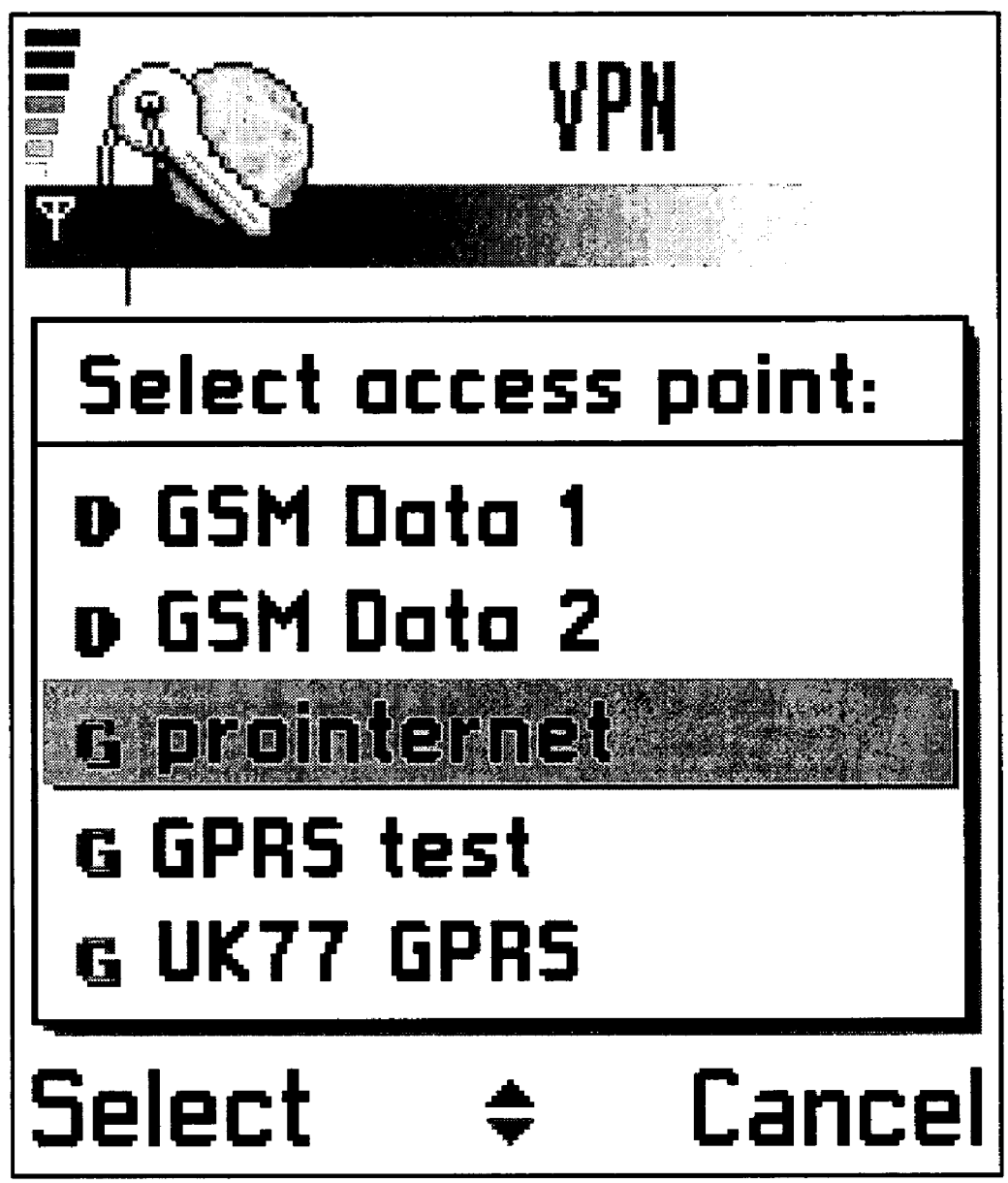
Figure 35:
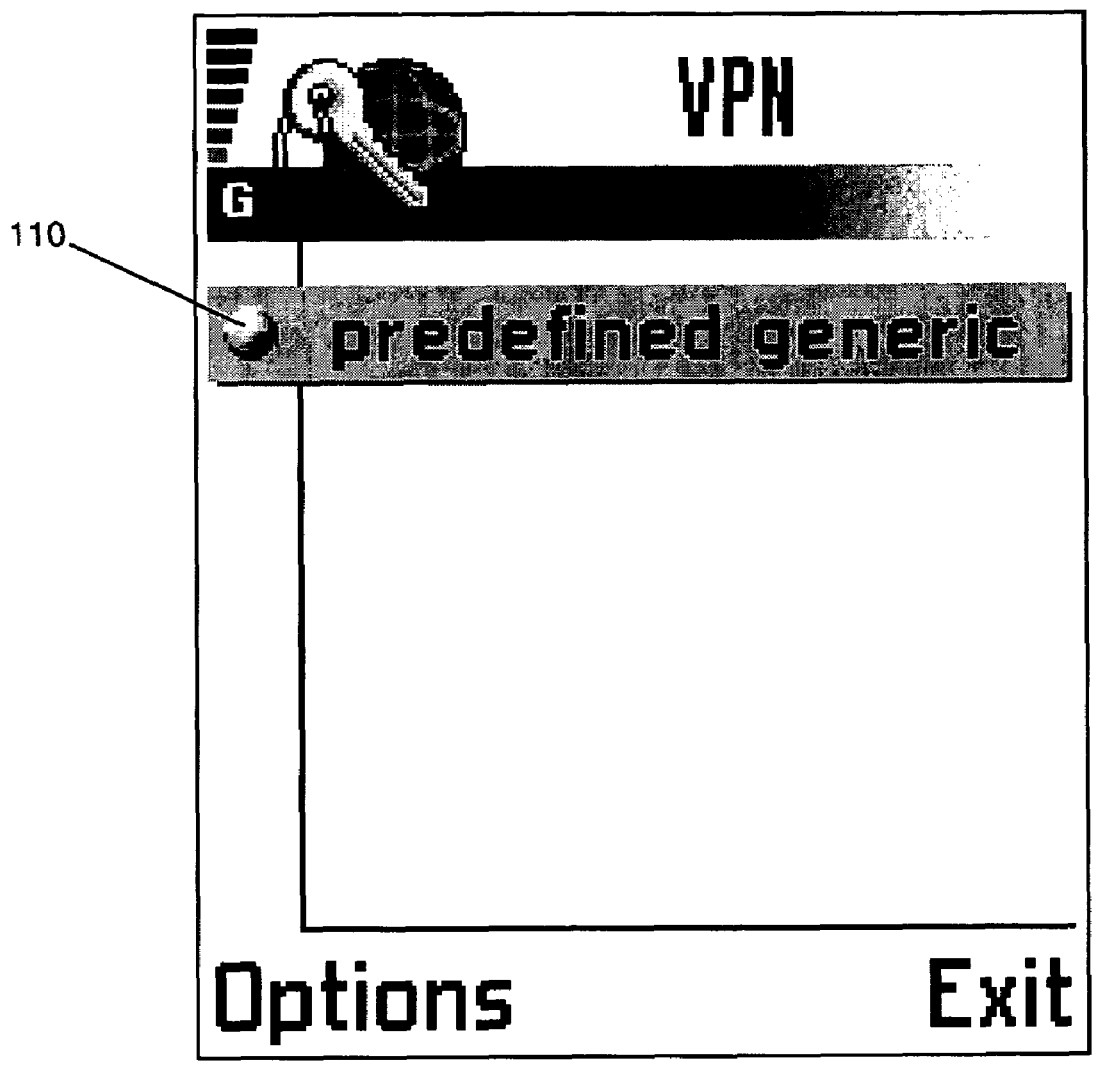

After a policy is downloaded, the user must activate it. In at least one embodiment, a user activates a policy by selecting the policy (FIG. 31) and then choosing "Activate" in an Options menu (FIG. 32). Policy activation is protected by the VPN client password (FIG. 33). For a certificate policy, this password also unlocks the private key functions. The user selects the Internet Access Point (IAP) he prefers to use to connect to the corporate network (FIG. 34). Once user has selected the IAP, the device initiates a connection to a VPN gateway by showing user that GPRS connection is active for "predefined generic" policy; a colored dot 110 indicates that the initialization is under way (FIG. 35). Upon successfully establishing a connection, the VPN tunnel is ready for use by any application, and the user interface advises that the "predefined generic" policy is active by changing the color of dot 110 to, e.g., green. The user can then securely access his or her data in the Intranet by selecting an appropriate application. The user can deactivate the VPN tunnel connection by returning to policy application and select "Deactivate" from the Options menu.

Figure 5:
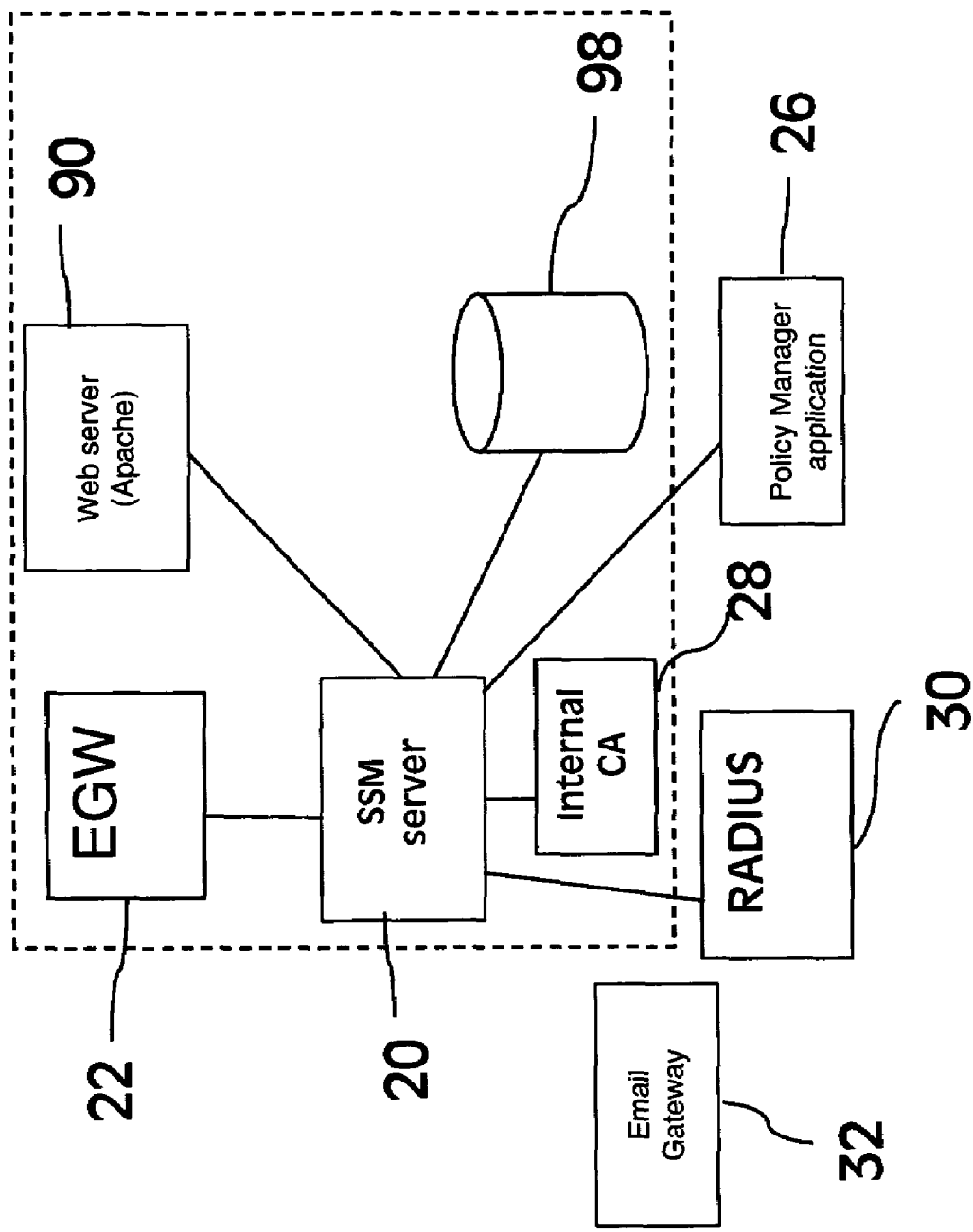
FIG. 5 is a block diagram of a server and other network components according to at least one embodiment of the invention.

In several embodiments, a SSM server includes various components and a management station. These components can be combined into a single platform or divided among multiple platforms. Referring to FIG. 5, SSM server 20 is shown inside the dashed box with an enrollment gateway (EGW) 22, a Web server 90, a database 98 and an internal CA 28 to indicate that these components, in at least some embodiments, reside on a single device. In other embodiments, some or all of these components reside on separate devices. In still other embodiments, other components (including, e.g., e-mail gateway 32, RADIUS server 30 or VPN policy manager application 26) could reside on the same device with SSM server 20.

Database 98 is an embedded relational database that stores information about the users, user groups, client policies, other files and their properties. The ACU client refers to SSM content objects in database 98 with logical identifiers such as, e.g., Acu_config_db<name>, and performs certificate enrollment using logical identifiers such as, e.g., Acu_cert_db<name>, which identifiers are recognized and interpreted by SSM server 20. End-users of SSM server 20 authenticate themselves before receiving access to the information or functionality of SSM server 20. Authentication is based on the use of authenticators (authentication providers). User identity in database 98 is of a type of a USERFQDN (user+fully qualified domain name, e.g., userid@domain). Further information from the users may include last name, first name, logon name, password, e-mail address, mobile phone number or IMEI, authentication server, user groups, self-provisioning rules, and matching rules.

SSM server 20 determines where a user is identified. There are at least three different types of authenticators. The first is a SSM authenticator, wherein the user id/password combinations are checked against database 98. Only one instance of this authenticator type can exist at a time. The second type of authenticator is a RADIUS authenticator, wherein the user id/password combinations are checked against RADIUS server 30. The passwords can be either normal passwords or one-time passwords generated with token cards (such as SecurID). Several instances of this authenticator type can exist at the same time.

The third type of authenticator is certificate authenticator, wherein the user must present a valid certificate and a signature. The certificate validity requires that it is signed by a trusted CA, and that it not be expired or revoked. If the signature was signed with the certificate, the user is considered authenticated. The email address in the subject alternative name extension field of the rfc822Name is used to map the user to a SSM user id. In the certificate request field an identity of the certificate subject is inserted in the subject alternative name extension field of the ACU client certificate as an rfc822Name (i.e., an e-mail address in the form "local-part@domain"). The e-mail address is constructed from a user name/ID asked from the user and the fully qualified domain name specified in the FQDN element, which value is used as the domain part in an e-mail address stored in the subject alternative name extension field of the ACU client certificate. The common name of the subject DN is the same as the local-part of the rfc822Name. If a subject DN suffix is present in a user certificate used to access a VPN gateway, it overrides a corresponding enrollment service configuration value. A flag indicates whether a user certificate used for accessing a VPN gateway should include the user identity as an rfc822Name in the certificates' subject alternative name extension field. Possible values are 0=no and 1=yes. If this value is present, it also overrides the corresponding enrollment service configuration value. The fully qualified domain name (FQDN) to be used is the rfc822Name value if the user identity is included as an rfc822Name in the certificates' subject alternative name extension field. If this value is present, it also overrides the corresponding enrollment service configuration value. The expected length of the private key whose corresponding public key is included in the user certificate used with this VPN gateway may also be provided. If this value is present, it also overrides the corresponding enrollment service configuration value.

Each authenticator has a name and a varying number of attributes that depend on the type of the authenticator. In at least one embodiment, all authenticator implementations support a common Java interface, the authenticator interface.

The association of authentication requests with authenticators is based on the credentials supplied (user id/password or a certificate/signature), a mapping of authenticators to users, and a set of self-provisioning rules. If the user making the authentication request has a record in the SSM database, the authenticator specified in that record is used to authenticate the user. If the record does not specify an authenticator, the authentication fails.

If the user making the authentication request does not have a record in the SSM database, the authentication is performed according to a set of self-provisioning rules. In one embodiment, a self-provisioning rule maps together three pieces of information: a domain ID, an authenticator and a user group. A domain ID is extracted from the user name included in the authentication request and compared to the domain IDs defined for the self-provisioning rules. If a matching rule is found, the authenticator specified in the found rule is used to authenticate the user. If a matching rule is not found, the authentication fails.

SSM components accessing other components without an end-user identity (e.g. a PKI server requesting a CRL (certificate revocation list) from SSM server 20) must also be authenticated. This is based on a shared secret that was given by the system administrator when he or she installed the components.

When an end-user is successfully authenticated with a self-provisioning rule (e.g., when there is no user record in database 98), a new user record is automatically created in database 98. The new user record is automatically associated with a user group that is specified as the default group in the self-provisioning rule that was used to authenticate the user. In addition, the new user record is associated with the authenticator that was used to authenticate the user.

A default user group can have any number of content entries associated with it; content can thus be automatically associated with users. Users can then retrieve content from SSM server 20 even if the administrator has not created or imported any user information to SSM server 20.

Once connected to SSM server 20, a user (either a client user or administrator) can use SSM server 20 according to permissions defined in the database 98. The permission information is also stored in database 98 for users that are authenticated against an external authentication server. In at least one embodiment, usage permissions are defined in the SSM as roles. A role is a definition of the objects that users are allowed to access, and the actions they can perform, when in that role. In one embodiment, SSM server 20 supports four different types of user groups: system managers, user managers, content managers and client users. Each of these group types has an associated role that is inherited by all actual groups of that type as well as by all users that belong to those groups. A user that belongs to several user groups with different roles inherits the least restricted role. In one embodiment, the default user group types and their roles are defined in SSM server 20 configuration or ACU configuration and cannot be changed via the SSM server 20 manager graphical user interface (GUI) or command line interface (CLI). By changing SSM server 20 configuration, however, roles associated with default group types can be changed.

Components accessing SSM server 20 functions over the network without a user identity have a special component role that is used to define what those components may do. In addition, there is a special internal role that is used internally by SSM server 20, which role can access all objects and perform all operations. Although VPN client software installation packages and VPN policies/profiles are types of content handled by the SSM, the SSM is not restricted to these content types.

The content that SSM server 20 delivers is not necessarily created within SSM server 20 itself. Rather, content can be created in external systems and imported to SSM server 20 as files. Inside SSM server 20, the files are turned into content entries with a certain multipurpose Internet mail extension (MIME) type. The import operation can be started from a CLI of SSM server 20. In some embodiments, the files to be imported must be accessible locally through normal file system operations.

SSM server 20 integrates with the policy manager application (PMA) 26 by allowing the policies and profiles created and maintained by PMA 26 to be exported to SSM server 20. This operation is initiated from within PMA 26. PMA 26 communicates with SSM server 20 via, e.g., a JAVA interface designed for this purpose.

SSM administrators can import user and user group information to SSM server 20 from external systems. In addition to plain user and user group information, user-to-group and group-to-group mapping information can also be imported to SSM server 20. For example, administrators can create users and user groups, search users and user groups, modify user and user group attributes, move and delete users and user groups, associate users with user groups and content entries, and associate user groups with other user groups (e.g., to form a group hierarchy).

Figure 6:
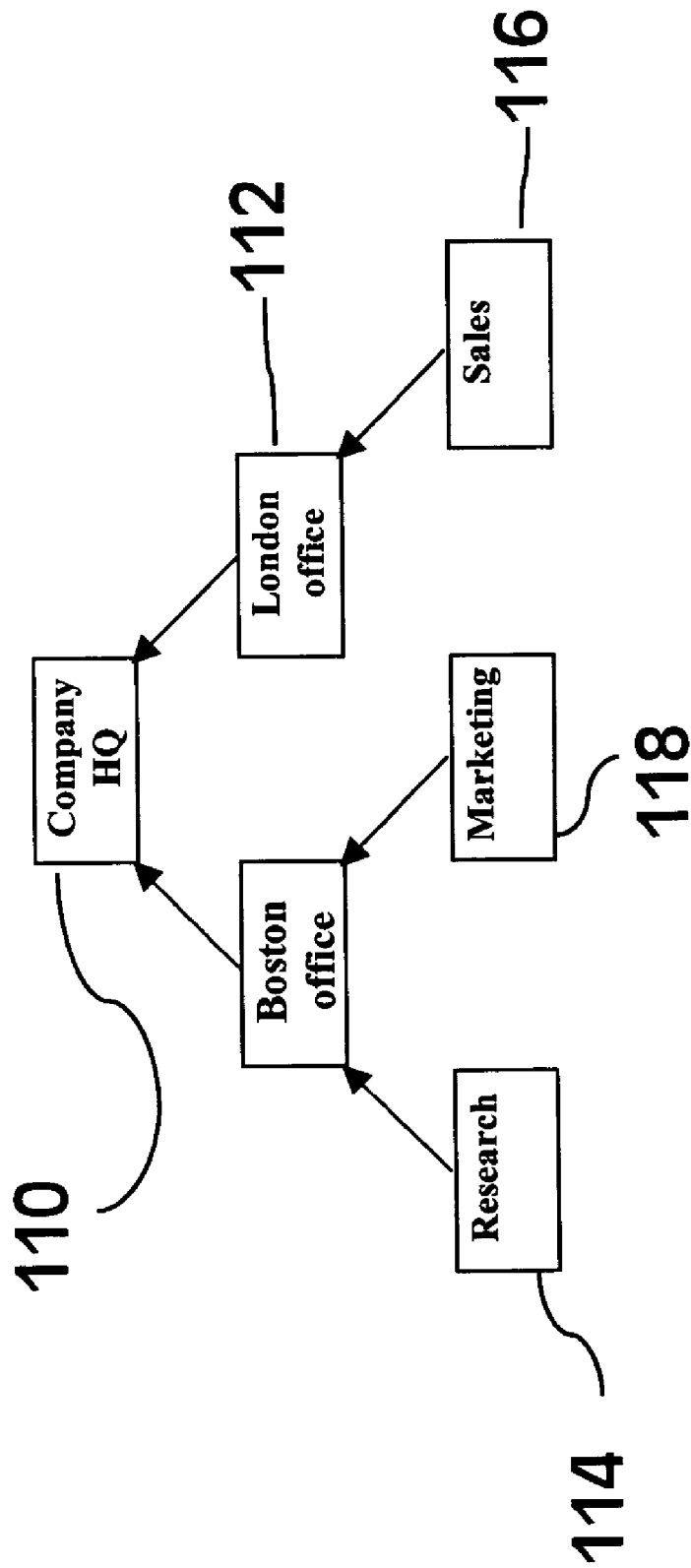
FIG. 6 is a block diagram of an enterprise network according to at least one embodiment of the invention.

FIG. 6 shows various user groups within an enterprise. The user groups can form a hierarchy where a single group 112, 114, 116 or 118 can have one parent group 110. The group hierarchy also forms a logical inheritance hierarchy. Child groups 112, 114, 116, 118 inherit certain properties from their parent groups 110. For example, the content entries associated with a group 110 are indirectly associated also with its child groups 112, 114, 116, 118. At the end of the inheritance hierarchy are users who inherit properties from the groups to which they belong.

Group 110 in FIG. 6 is associated with a single policy and a single user. However, because of the inheritance mechanism (sales is inherited from London office which is inherited from Company HQ), the group of users 116 has different associated policies than do groups 114 and 118. Paul Boss has a one associated policy, the Company HQ policy, through the Company HQ group 110. Mary Scary is in the London office and has two associated policies, Company HQ 110 and London 112. Tim Tooth works in the London sales office and has three associated policies: Company HQ 110, London 112 and Sales 116.

When a content entry is associated with a user group 110, the entry is indirectly associated also with all users and groups that belong to that group or any of its child groups. This indirect association is enforced at run-time by application logic that traverses the group hierarchy from bottom to top. When a content entry is deleted, all of its associations with users and user groups are also deleted.

EGW 22 (FIGS. 2, 5) certificates for ACU authentication are issued from SSM internal Certification Authority (CA) 28. EGW 22 can also issue certificates for VPN authentication from internal CA 28. Alternatively (or additionally), EGW 22 can communicate with External CAs, acting as a Registration Authority (RA) towards external CAs and as a control point for client certificate enrollment requests, and can forward enrollment requests to an appropriate CA using SCEP (simple certificate enrollment protocol) or CRS (certificate request syntax). In some embodiments, EGW 22 provides enrollment protocol conversion.

In various embodiments, Web server 90 acts as an external interface to SSM server 20. A mobile device 10 sends a certificate enrollment request to Web server 90, which forwards it to the EGW 22. Mobile device 10 also connects to Web server 90 for automatic content updates from SSM database 98. A VPN policy manager application 26 exports client policies (or profiles) to Web server 90, which stores them in SSM database 98. As indicated above, the SSM system may comprise a number of server and client components.

SSM server 20 uses the Remote Authentication Dial In User Service (RADIUS, RFC2138) protocol to communicate with external authentication servers. This protocol is transported over user datagram protocol (UDP).

In some embodiments, SSM Server 20 is the central component in the SSM system, and the only component that accesses the internal database or the external authentication servers.

EGW 22 provides SSM Public Key Infrastructure services: certificate EGW (enrollment gateway) 22 and certificates for ACU authentication issued from SSM internal certificate authority 28. Certificates for VPN authentication may come from SSM internal CA 28 and/or external CAs. In some embodiments, only SSM server 20 classes can access EGW 22 directly, and other components (e.g., management applications, web servlets) access EGW 22 only through the management interfaces of SSM server 20.

EGW 22 uses SSM server 20 to store its persistent data (e.g., certificates, CRLs, etc.) as well as to authenticate and authorize certificate enrollment requests. EGW Server 22 communicates with SSM server 20.

SSM server 20 has a GUI and/or CLI to provide management and administrator interface to SSM server management functions.

SSM server 20 publishes two interfaces that are used to import policies, profiles, and other content to be distributed. A generic HTTP-based content update API can be used by any external software component. The HTTP servlet imports the content into database 98. Web server 90 implements the SSM end-user functionality. Web server 90 also runs servlets which handle XML processing of the ACU requests, forward HTTP requests to EGW Server 22 (through SSM server 20), and provide the HTTP based import interface.

Web server 90 is a HTTP(S) listener for SSM server 20. In at least one embodiment, this is the only component in the system which listens for requests coming from the external network.

SSM server 20 components use several network interfaces and protocols to communicate with each other or with external systems. EGW server 22 and SSM server 20 can communicate using any appropriate protocol. In one embodiment, a request/response protocol over two TCP/IP connections (one for each direction) is used. The tag-length-value based protocol is encrypted and both parties are authenticated by the fact that they know the secret key which is derived from the shared secret asked during the installation.

SSM server 20 uses, e.g., Simple Mail Transfer Protocol (SMTP) over TCP/IP to send e-mail notifications to end-users. An e-mail gateway is used to route e-mail messages.

As indicated, and in at least one embodiment, all requests from a VPN client of a mobile device 10, as well from an end-user's browser, come over HTTP to Web server 90. These requests include a user's web browser sending HTTPS requests to Web server 90, in response to which Web server 90 provides HTML pages and/or downloaded files. These connections are encrypted with SSL; SSM server 20 is authenticated based on its certificate and the mobile device is authenticated with a username/password. Web server 90 also receives certificate enrollment requests from the VPN client of mobile device 10 over HTTP. The requests are encrypted and signed, and a plain HTTP connection may be used. Web server 90 also receives Automatic Content Update (ACU) requests from the VPN client of mobile device 10. These requests are encrypted and signed; SSM server 20 is authenticated based on its certificate and mobile device 10 is authenticated with a username/password or a certificate issued for this purpose.

HTTP connections from the clients in the public Internet 14 (e.g., device 11) pass through a firewall 18 and/or a proxy/gateway 24. An application on device 11 can import and update policies from SSM server 20 using a HTTP connection encrypted with SSL (HTTPS). SSM server 20 is authenticated based on the certificate and device 11 is authenticated with a username/password, and the user belongs to the Content Manager group, e.g., when policy manager application 26 pushes policies towards SSM server 20. Once connected to SSM server 20, a user (user 11 or administrator) can use SSM server 20 according to the permissions defined in the SSM. In one embodiment, the permission information is stored in database 98, even for users that are authenticated against an external authentication server.

VPN gateway 24 uses HTTP to request Certificate Revocation Lists (CRLs) from the EGW 22 (through Web server 90 and SSM server 20). CRLs are signed entities that can be transported over a plain HTTP connection without encryption.

EGW 22 may connect to external Certification Authorities to forward certificate requests over HTTP.

SSM server 20 is not limited to use as a VPN policy deployment tool. SSM server 20 supports scalable deployment of PKI and secure distribution of any content to authenticated and authorized end-users. Scalable PKI data generation can be delegated to VPN clients. In such case, a user receives a generic policy (i.e., a profile) without PKI data, and the user's VPN client generates the PKI data before the policy is used. In particular, the client generates a public/private key pair and corresponding certificate enrollment request and sends the request to a Certification Authority (CA). The CA then creates and returns the certificate.

The many features and advantages of the present invention are apparent from the detailed specification, and thus, it is intended by the appended claims to cover all such features and advantages of the invention which fall within the spirit and scope of the invention. Numerous modifications and variations will occur to those skilled in the art, and the invention is not limited to the exact construction and operation illustrated and described herein. All suitable modifications and equivalents which may be resorted to are within the scope of the claims. The foregoing description is intended to be exemplary rather than limiting. As but one example, the invention has been described by reference to a SSM server 20; devices, systems and methods according to the invention could include (and/or include communication with) multiple SSM servers 20. The invention further includes (and/or includes communication with) servers and devices that that lack all of the features described with regard to SSM server 20, and/or that contain additional features. As another example, a returned certificate can be validated based on a hash calculated over an entire ACU message (except for the signature element of the ACU message) resulting in a first response from a remote device, with the hash being signed with a private key held by the remote device, and with the corresponding certificate being included in the first response and used by the recipient to verify the signature and identify and authenticate the sender. These and other modifications are within the scope of the invention as defined in the attached claims.

We claim:

1. A method for comprising:
   (a) connecting a user device via a publicly-accessible network to a server;
   (b) receiving a certificate;
   (c) calculating an identifier of the received certificate and converting it to a character string;
   (d) modifying the string by removing at least one random character from the string;
   (e) displaying the modified string;
   (f) receiving, from a user input corresponding to the at least one removed character; and
   (g) continuing connection to the server only if the user input matches the at least one removed character.

2. The method of claim 1, further comprising randomly selecting multiple characters for removal.

3. The method of claim 2, wherein the randomly selected characters are replaced with a character indicating the replacement.

4. The method of claim 2, wherein the modified string is displayed with spaces replacing the removed characters.

5. The method of claim 1, wherein the device is a mobile telephone and the at least one removed character is a digit.

6. The method of claim 1, wherein receiving the certificate comprises receiving the certificate from a certification authority.

7. The method of claim 1, wherein the position of the at least one character removed from the string is different during a subsequent connection attempt.

8. The method of claim 1, wherein the at least one removed character is removed based on the capabilities of the user device.

9. The method of claim 1, wherein receiving input corresponding to the at least one removed character comprises receiving input from a user previously provided with the identifier through a one of the mail or a company newsletter.

10. The method of claim 1, wherein the at least one removed character is a digit, and wherein no non-digit characters are removed.

11. The method of claim 1, further comprising:
    repeating steps (a) through (g) on each attempt to connect the device to the server.

12. A device comprising:
    an interface configured to access a publicly accessible network; and
    a processor configured to perform:
        receiving, via the interface, a certificate from a remotely located server,
        calculating an identifier of the received certificate and converting it to a character string,
        modifying the string by removing at least one random character from the string,
        displaying the modified string,
        receiving, from a user of the device, input corresponding to the at least one removed character, and
        continuing connection to the server only if the user input matches the at least one removed character.

13. A machine-readable medium having machine-executable instructions for performing:
    connecting a user device via a publicly-accessible network to a server;
    receiving a certificate;
    calculating an identifier of the received certificate and converting it to a character string;
    modifying the string by removing at least one random character from the string;
    displaying the modified string;
    receiving, from a user, input corresponding to the at least one removed character, and
    continuing connection to the server only if the user input matches the at least one removed character.

14. A method for conducting secure communications, comprising:
    connecting a user device via a publicly-accessible network to a server;
    receiving a certificate;
    receiving a modified identifier, the identifier having previously been calculated for the certificate outside of the user device and modified outside of the user device by removal of at least one random character;
    displaying the modified identifier;
    receiving, from a user previously provided with the identifier, input corresponding to the at least one removed character; and
    continuing connection to the server only if the user input matches the at least one removed character.

15. The method of claim 1, wherein the identifier was previously provided to the user through a trusted medium.

16. The device of claim 12, wherein the identifier was previously provided to the user through a trusted medium.

17. The device of claim 12, wherein the processor is further configured to perform;
    randomly selecting multiple characters for removal, wherein the randomly selected characters are replaced with a character indicating the replacement.

18. The device of claim 12, wherein the modified string is displayed with spaces replacing the removed characters.

19. The device of claim 12, wherein the device is a mobile telephone and the at least one removed character is a digit.

20. The device of claim 12, wherein the position of the at least one character removed from the string is different during a subsequent connection attempt.

* * * * *

UNITED STATES PATENT AND TRADEMARK OFFICE
CERTIFICATE OF CORRECTION

PATENT NO.        : 7,444,508 B2                                           Page 1 of 1
APPLICATION NO. : 10/608818
DATED             : October 28, 2008
INVENTOR(S)       : Jari Karjala et al.

It is certified that error appears in the above-identified patent and that said Letters Patent is hereby corrected as shown below:

In Column 21, Claim 9, Line 44:
Please delete "a one of the mail or a company newsletter" and insert --mail or a company newsletter.--

Signed and Sealed this

Fourteenth Day of July, 2009

JOHN DOLL
*Acting Director of the United States Patent and Trademark Office*

UNITED STATES PATENT AND TRADEMARK OFFICE
CERTIFICATE OF CORRECTION

PATENT NO.         : 7,444,508 B2
APPLICATION NO.    : 10/608818
DATED              : October 28, 2008
INVENTOR(S)        : Jari Karjala et al.

Page 1 of 1

It is certified that error appears in the above-identified patent and that said Letters Patent is hereby corrected as shown below:

On the Title Page, Section 73:
  Please delete "Nokia Corporation, Espoo (FI)" and insert --Nokia, Inc 6000 Connection Drive Irving, TX 75039--

Signed and Sealed this

Eighth Day of September, 2009

David J. Kappos
*Director of the United States Patent and Trademark Office*